United States Patent
Loheide et al.

(10) Patent No.: US 10,848,826 B2
(45) Date of Patent: Nov. 24, 2020

(54) CONCURRENT PRESENTATION OF NON-PROGRAMMING MEDIA ASSETS WITH PROGRAMMING MEDIA CONTENT AT CLIENT DEVICE

(71) Applicant: Turner Broadcasting System, Inc., Atlanta, GA (US)

(72) Inventors: Donald Jude Loheide, Mableton, GA (US); Matthew Paul Giles, Marietta, GA (US); Gregory Mcclain Stigall, Douglasville, GA (US); Nishith Kumar Sinha, Mableton, GA (US); Cindy Loren Campbell, Atlanta, GA (US); James J Arnzen, Atlanta, GA (US); Nicolas Paul Webb, Mcdonough, GA (US)

(73) Assignee: TURNER BROADCASTING SYSTEM, INC., Atlanta, GA (US)

( * ) Notice: Subject to any disclaimer, the term of this patent is extended or adjusted under 35 U.S.C. 154(b) by 0 days.

(21) Appl. No.: 15/986,218

(22) Filed: May 22, 2018

(65) Prior Publication Data
US 2018/0343491 A1   Nov. 29, 2018

Related U.S. Application Data

(60) Provisional application No. 62/511,190, filed on May 25, 2017.

(51) Int. Cl.
*H04N 7/16* (2011.01)
*H04N 21/458* (2011.01)
(Continued)

(52) U.S. Cl.
CPC ....... *H04N 21/458* (2013.01); *G06Q 30/0242* (2013.01); *G06Q 30/0251* (2013.01);
(Continued)

(58) Field of Classification Search
CPC ............ H04N 21/485; H04N 21/8545; H04N 21/42204; H04N 21/2665; H04N 21/64322
(Continued)

(56) References Cited

U.S. PATENT DOCUMENTS

| | | |
|---|---|---|
| 3,751,581 A | 8/1973 | Sakata et al. |
| 4,500,930 A | 2/1985 | Hamalainen et al. |

(Continued)

OTHER PUBLICATIONS

Advisory Action in U.S. Appl. No. 15/396,453 dated Apr. 20, 2018.
(Continued)

*Primary Examiner* — Jivka A Rabovianski
(74) *Attorney, Agent, or Firm* — Chip Law Group

(57) ABSTRACT

A media presentation and distribution system communicatively coupled to a client device, which handles enablement of a client-side dynamic presentation of at least one non-programming media asset along with programming media content. The client device receives a first media stream of the programming media content in response to a request, associated with at least one user preference for the programming media content, to the media presentation and distribution system. The client device identifies at least one tag in the programming media content and transmits at least one event opportunity point for selection to the media presentation distribution system. Based on the selection, the client device modifies a display view of the client device for a defined duration, and presents the at least one non-programming media asset, from a second media stream for the defined duration, concurrently with the programming media content over the modified display view of the client device.

23 Claims, 10 Drawing Sheets

(51) Int. Cl.

| | |
|---|---|
| H04L 29/08 | (2006.01) |
| H04N 21/431 | (2011.01) |
| H04N 21/81 | (2011.01) |
| G06Q 30/02 | (2012.01) |
| H04L 29/06 | (2006.01) |
| H04N 21/478 | (2011.01) |
| H04N 21/233 | (2011.01) |
| H04N 21/234 | (2011.01) |
| H04N 21/2387 | (2011.01) |
| H04N 21/2389 | (2011.01) |
| H04N 21/8545 | (2011.01) |
| G06Q 30/06 | (2012.01) |
| H04N 21/2543 | (2011.01) |
| H04N 21/44 | (2011.01) |
| H04N 21/845 | (2011.01) |
| H04N 21/235 | (2011.01) |
| H04N 21/258 | (2011.01) |
| H04N 21/435 | (2011.01) |
| H04N 21/6332 | (2011.01) |
| H04N 21/266 | (2011.01) |
| H04N 21/84 | (2011.01) |
| H04N 21/239 | (2011.01) |
| H04N 21/262 | (2011.01) |
| H04N 21/2668 | (2011.01) |
| H04N 21/6587 | (2011.01) |
| H04L 9/32 | (2006.01) |
| H04N 21/24 | (2011.01) |
| H04N 21/472 | (2011.01) |
| H04N 21/835 | (2011.01) |
| H04H 20/10 | (2008.01) |
| H04N 21/8358 | (2011.01) |

(52) U.S. Cl.
CPC ..... *G06Q 30/0275* (2013.01); *G06Q 30/0633* (2013.01); *H04L 9/32* (2013.01); *H04L 65/4084* (2013.01); *H04L 65/60* (2013.01); *H04L 67/1097* (2013.01); *H04L 67/125* (2013.01); *H04L 67/16* (2013.01); *H04L 67/306* (2013.01); *H04L 67/32* (2013.01); *H04L 67/42* (2013.01); *H04N 21/233* (2013.01); *H04N 21/2353* (2013.01); *H04N 21/2387* (2013.01); *H04N 21/2393* (2013.01); *H04N 21/23418* (2013.01); *H04N 21/23424* (2013.01); *H04N 21/23892* (2013.01); *H04N 21/24* (2013.01); *H04N 21/2543* (2013.01); *H04N 21/25883* (2013.01); *H04N 21/25891* (2013.01); *H04N 21/266* (2013.01); *H04N 21/2668* (2013.01); *H04N 21/26208* (2013.01); *H04N 21/26241* (2013.01); *H04N 21/435* (2013.01); *H04N 21/4312* (2013.01); *H04N 21/4316* (2013.01); *H04N 21/44008* (2013.01); *H04N 21/44016* (2013.01); *H04N 21/47217* (2013.01); *H04N 21/47815* (2013.01); *H04N 21/6332* (2013.01); *H04N 21/6587* (2013.01); *H04N 21/812* (2013.01); *H04N 21/835* (2013.01); *H04N 21/84* (2013.01); *H04N 21/845* (2013.01); *H04N 21/8545* (2013.01); *G06Q 2220/00* (2013.01); *H04H 20/10* (2013.01); *H04N 21/8358* (2013.01)

(58) Field of Classification Search
USPC .................. 725/151, 10, 32, 36, 50
See application file for complete search history.

(56) References Cited

U.S. PATENT DOCUMENTS

| | | |
|---|---|---|
| 5,294,981 A | 3/1994 | Yazolino et al. |
| 6,229,524 B1 | 5/2001 | Chernock et al. |
| 6,378,129 B1 | 4/2002 | Zetts |
| 6,434,621 B1 | 8/2002 | Pezzillo et al. |
| 6,625,811 B1 | 9/2003 | Kaneko |
| 6,701,355 B1 | 3/2004 | Brandt et al. |
| 6,727,914 B1 | 4/2004 | Gutta |
| 7,051,352 B1 | 5/2006 | Schaffer |
| 7,337,458 B2 | 2/2008 | Michelitsch et al. |
| 7,380,262 B2 | 5/2008 | Wang et al. |
| 7,581,237 B1 | 8/2009 | Kurapati |
| 7,840,980 B2 | 11/2010 | Gutta |
| 7,985,134 B2 | 7/2011 | Ellis |
| 8,005,826 B1 | 8/2011 | Sahami et al. |
| 8,099,757 B2 | 1/2012 | Riedl et al. |
| 8,132,203 B2 | 3/2012 | Heer |
| 8,533,761 B1 | 9/2013 | Sahami et al. |
| 8,572,649 B1 | 10/2013 | Gossweiler et al. |
| 8,578,042 B2 | 11/2013 | Hu et al. |
| 8,631,440 B2 | 1/2014 | Gossweiler et al. |
| 8,826,443 B1 | 9/2014 | Raman et al. |
| 8,842,879 B2 | 9/2014 | Laksono et al. |
| 8,843,965 B1 | 9/2014 | Kurapati et al. |
| 9,094,639 B2 | 7/2015 | Yim et al. |
| 9,130,918 B2 | 9/2015 | Picconi et al. |
| 9,342,668 B2 | 5/2016 | Wang et al. |
| 9,380,264 B1 | 6/2016 | Vakalapudi |
| 9,390,447 B1 | 7/2016 | Smith |
| 10,075,753 B2 | 9/2018 | Loheide et al. |
| 2002/0038457 A1 | 3/2002 | Numata et al. |
| 2002/0178447 A1 | 11/2002 | Plotnick et al. |
| 2003/0023757 A1 | 1/2003 | Ishioka et al. |
| 2003/0026628 A1 | 2/2003 | Arimoto |
| 2003/0051239 A1 | 3/2003 | Hudspeth |
| 2003/0110507 A1 | 6/2003 | Dimitrova et al. |
| 2003/0126600 A1 | 7/2003 | Heuvelman |
| 2003/0151538 A1 | 8/2003 | Escobosa et al. |
| 2003/0182658 A1 | 9/2003 | Alexander |
| 2003/0212708 A1 | 11/2003 | Potrebic et al. |
| 2003/0236832 A1 | 12/2003 | McIntyre et al. |
| 2004/0022278 A1 | 2/2004 | Thomas et al. |
| 2004/0031056 A1 | 2/2004 | Wolff |
| 2004/0128682 A1 | 7/2004 | Liga et al. |
| 2004/0163103 A1 | 8/2004 | Swix et al. |
| 2005/0015816 A1 | 1/2005 | Christofalo et al. |
| 2005/0060745 A1 | 3/2005 | Riedl et al. |
| 2005/0096978 A1 | 5/2005 | Black |
| 2005/0120369 A1 | 6/2005 | Matz |
| 2005/0132401 A1 | 6/2005 | Boccon-Gibod et al. |
| 2005/0135613 A1 | 6/2005 | Brandenburg et al. |
| 2006/0031889 A1 | 2/2006 | Bennett et al. |
| 2006/0064730 A1 | 3/2006 | Rael et al. |
| 2006/0122916 A1 | 6/2006 | Kassan |
| 2006/0287915 A1 | 12/2006 | Boulet et al. |
| 2007/0011718 A1 | 1/2007 | Nee |
| 2007/0033419 A1 | 2/2007 | Kocher et al. |
| 2007/0186228 A1 | 8/2007 | Ramaswamy et al. |
| 2007/0238035 A1 | 10/2007 | Holscher et al. |
| 2007/0250901 A1 | 10/2007 | McIntire et al. |
| 2008/0086742 A1 | 4/2008 | Aldrey et al. |
| 2008/0201735 A1 | 8/2008 | Sumiyoshi et al. |
| 2008/0271078 A1 | 10/2008 | Gossweiler et al. |
| 2008/0271080 A1 | 10/2008 | Gossweiler et al. |
| 2008/0320513 A1 | 12/2008 | Wong et al. |
| 2009/0070808 A1 | 3/2009 | Jacobs |
| 2009/0070819 A1 | 3/2009 | Gajda et al. |
| 2009/0100452 A1 | 4/2009 | Hudgeons et al. |
| 2009/0254934 A1 | 10/2009 | Grammens |
| 2009/0256972 A1 | 10/2009 | Ramaswamy et al. |
| 2009/0285217 A1 | 11/2009 | Frink et al. |
| 2009/0287790 A1 | 11/2009 | Upton et al. |
| 2010/0125880 A1 | 5/2010 | Roewe |
| 2010/0146548 A1 | 6/2010 | Yim et al. |
| 2010/0146559 A1 | 6/2010 | Lee et al. |
| 2010/0169914 A1 | 7/2010 | Williamson et al. |

(56) References Cited

U.S. PATENT DOCUMENTS

| | | |
|---|---|---|
| 2010/0325655 A1 | 12/2010 | Perez |
| 2010/0325657 A1 | 12/2010 | Sellers et al. |
| 2011/0022471 A1 | 1/2011 | Brueck et al. |
| 2011/0052144 A1 | 3/2011 | Abbas et al. |
| 2011/0123062 A1 | 5/2011 | Hilu |
| 2011/0153464 A1 | 6/2011 | Hendricks et al. |
| 2011/0161500 A1 | 6/2011 | Yengalasetti et al. |
| 2011/0164115 A1 | 7/2011 | Bennett et al. |
| 2011/0177775 A1 | 7/2011 | Gupta et al. |
| 2011/0209181 A1 | 8/2011 | Gupta et al. |
| 2011/0238754 A1 | 9/2011 | Dasilva et al. |
| 2012/0017282 A1 | 1/2012 | Kang et al. |
| 2012/0110621 A1 | 5/2012 | Gossweiler |
| 2012/0143693 A1 | 6/2012 | Chung et al. |
| 2012/0192232 A1 | 7/2012 | Ellis |
| 2012/0271942 A1 | 10/2012 | Walker et al. |
| 2012/0272264 A1 | 10/2012 | Suzuki et al. |
| 2012/0284737 A1 | 11/2012 | Savoor et al. |
| 2012/0304223 A1 | 11/2012 | Sargent et al. |
| 2013/0121487 A1 | 5/2013 | Lorberbaum et al. |
| 2013/0160051 A1 | 6/2013 | Armstrong et al. |
| 2013/0198328 A1 | 8/2013 | Green et al. |
| 2013/0205212 A1 | 8/2013 | Sinha et al. |
| 2013/0208811 A1 | 8/2013 | Liu et al. |
| 2013/0227283 A1 | 8/2013 | Williamson et al. |
| 2013/0227284 A1 | 8/2013 | Pfeffer et al. |
| 2013/0263168 A1 | 10/2013 | Choi |
| 2013/0263182 A1 | 10/2013 | Ivy et al. |
| 2013/0276023 A1 | 10/2013 | Kent et al. |
| 2013/0305287 A1 | 11/2013 | Wong et al. |
| 2013/0312041 A1 | 11/2013 | Gresta |
| 2013/0325605 A1 | 12/2013 | Callaghan et al. |
| 2014/0013354 A1 | 1/2014 | Johnson et al. |
| 2014/0020017 A1 | 1/2014 | Stern et al. |
| 2014/0032259 A1 | 1/2014 | LaFever et al. |
| 2014/0033240 A1 | 1/2014 | Card |
| 2014/0071818 A1 | 3/2014 | Wang et al. |
| 2014/0143806 A1 | 5/2014 | Steinberg et al. |
| 2014/0150019 A1 | 5/2014 | Ma et al. |
| 2014/0152894 A1 | 6/2014 | Childs et al. |
| 2014/0157312 A1 | 6/2014 | Williams et al. |
| 2014/0173666 A1* | 6/2014 | Gordon .............. H04N 21/2665 725/51 |
| 2014/0189743 A1 | 7/2014 | Kennedy et al. |
| 2014/0189754 A1 | 7/2014 | Major et al. |
| 2014/0237243 A1 | 8/2014 | Ma et al. |
| 2014/0282723 A1 | 9/2014 | Sinha et al. |
| 2014/0310745 A1 | 10/2014 | Canney et al. |
| 2014/0317666 A1 | 10/2014 | Chiarulli et al. |
| 2014/0351843 A1 | 11/2014 | Theriault |
| 2014/0359656 A1* | 12/2014 | Banica ................. H04N 21/812 725/32 |
| 2014/0366068 A1 | 12/2014 | Burkitt et al. |
| 2015/0012926 A1 | 1/2015 | Wei et al. |
| 2015/0033255 A1 | 1/2015 | Neumann et al. |
| 2015/0058874 A1 | 2/2015 | Sun et al. |
| 2015/0074732 A1 | 3/2015 | Green et al. |
| 2015/0106856 A1 | 4/2015 | Rankine |
| 2015/0127845 A1 | 5/2015 | Phillips et al. |
| 2015/0237386 A1 | 8/2015 | Sheehan et al. |
| 2015/0237389 A1 | 8/2015 | Grouf et al. |
| 2015/0249865 A1 | 9/2015 | Oliveira |
| 2015/0271234 A1 | 9/2015 | O'Malley et al. |
| 2015/0289022 A1 | 10/2015 | Gross |
| 2015/0382042 A1 | 12/2015 | Wagenaar et al. |
| 2015/0382047 A1 | 12/2015 | Os et al. |
| 2015/0382274 A1 | 12/2015 | Logvinov et al. |
| 2016/0029055 A1 | 1/2016 | Nunez et al. |
| 2016/0063530 A1 | 3/2016 | Lin |
| 2016/0073155 A1 | 3/2016 | Subramaniam et al. |
| 2016/0112740 A1 | 4/2016 | Francisco et al. |
| 2016/0127786 A1 | 5/2016 | Langer |
| 2016/0127788 A1 | 5/2016 | Roberts et al. |
| 2016/0182954 A1 | 6/2016 | Nguyen et al. |
| 2016/0198202 A1 | 7/2016 | Brandenburg et al. |
| 2016/0227260 A1 | 8/2016 | Hundemer et al. |
| 2016/0255391 A1 | 9/2016 | Noble |
| 2016/0308958 A1 | 10/2016 | Navali et al. |
| 2016/0316247 A1 | 10/2016 | Biagini et al. |
| 2017/0064400 A1 | 3/2017 | Riegel et al. |
| 2017/0070789 A1 | 3/2017 | Liassides et al. |
| 2017/0085935 A1 | 3/2017 | Riedel et al. |
| 2017/0099525 A1 | 4/2017 | Ray et al. |
| 2017/0171610 A1 | 6/2017 | Nair et al. |
| 2017/0193544 A1 | 7/2017 | Glasgow et al. |
| 2017/0195718 A1 | 7/2017 | Nair et al. |
| 2017/0201779 A1 | 7/2017 | Publicover et al. |
| 2017/0238035 A1 | 8/2017 | Perez |
| 2017/0289597 A1 | 10/2017 | Riedel et al. |
| 2018/0007060 A1 | 1/2018 | Leblang et al. |
| 2018/0048599 A1 | 2/2018 | Arghandiwal et al. |
| 2018/0131986 A1 | 5/2018 | Cole et al. |
| 2018/0165650 A1 | 6/2018 | Kashyape et al. |
| 2018/0184047 A1 | 6/2018 | Simonsen et al. |
| 2018/0300751 A1 | 10/2018 | Hammitt et al. |
| 2018/0343505 A1 | 11/2018 | Loheide et al. |
| 2020/0244778 A1 | 7/2020 | Berookhim et al. |

OTHER PUBLICATIONS

Advisory Action in U.S. Appl. No. 15/396,468 dated Jan. 7, 2019.
Advisory Action in U.S. Appl. No. 15/396,475 dated Sep. 20, 2018.
Advisory Action in U.S. Appl. No. 15/396,614 dated Mar. 16, 2018.
Corrected Notice of Allowance in U.S. Appl. No. 15/396,462 dated Aug. 8, 2018.
Corrected Notice of Allowance in U.S. Appl. No. 15/396,462 dated Jul. 11, 2018.
Final Office Action in U.S. Appl. No. 15/396,468 dated Nov. 15, 2018.
Final Office Action in U.S. Appl. No. 15/396,475 dated Feb. 25, 2019.
Final Office Action in U.S. Appl. No. 15/396,475 dated Jul. 12, 2018.
Final Office Action in U.S. Appl. No. 15/396,614 dated Oct. 25, 2018.
Final Office Action in U.S. Appl. No. 15/396,624 dated Jan. 24, 2019.
Non-Final Office Action in U.S. Appl. No. 15/396,453 dated Jun. 14, 2018.
Non-Final Office Action in U.S. Appl. No. 15/396,468 dated Jul. 3, 2018.
Non-Final Office Action in U.S. Appl. No. 15/396,475 dated Nov. 30, 2018.
Non-Final Office Action in U.S. Appl. No. 15/396,614 dated May 18, 2018.
Non-Final Office Action in U.S. Appl. No. 15/396,624 dated Jul. 13, 2018.
Notice of Allowance in U.S. Appl. No. 15/396,453 dated Jan. 10, 2019.
Notice of Allowance in U.S. Appl. No. 15/396,462 dated Jun. 1, 2018.
Notice of Allowance in U.S. Appl. No. 15/396,462 dated May 15, 2018.
Office Action in U.S. Appl. No. 15/396,468 dated Jan. 26, 2018.
Office Action in U.S. Appl. No. 15/396,453 dated Feb. 27, 2018.
Office Action in U.S. Appl. No. 15/396,475 dated Mar. 29, 2018.
Advisory Action for U.S. Appl. No. 15/396,475 dated Jun. 3, 2019.
Corrected Notice of Allowance for U.S. Appl. No. 15/396,453 dated Jun. 3, 2019.
Final Office Action for U.S. Appl. No. 15/988,308 dated May 9, 2019.
Non-Final Office Action in U.S. Appl. No. 15/396,468 dated Mar. 1, 2019.
Non-Final Office Action in U.S. Appl. No. 15/396,614 dated Mar. 7, 2019.
Notice of Allowance for U.S. Appl. No. 15/396,624 dated May 31, 2019.
Corrected Notice of Allowance in U.S. Appl. No. 15/396,453 dated Jun. 13, 2019.

(56) References Cited

OTHER PUBLICATIONS

Non-Final Office Action for U.S. Appl. No. 15/986,451 dated Jun. 27, 2019.
Non-final Office Action for U.S. Appl. No. 15/988,241 dated Jun. 27, 2019.
Advisory Action for U.S. Appl. No. 15/988,308 dated Jul. 16, 2019.
Non-Final Office Action for U.S. Appl. No. 15/986,361 dated Jul. 11, 2019.
Advisory Action for U.S. Appl. No. 15/396,614 dated Oct. 24, 2019.
Corrected Notice of Allowance for U.S. Appl. No. 15/396,453 dated Aug. 21, 2019.
Corrected Notice of Allowance for U.S. Appl. No. 15/396,624 dated Sep. 5, 2019.
Final Office Action for U.S. Appl. No. 15/396,468 dated Nov. 6, 2019.
Final Office Action for U.S. Appl. No. 15/396,614 dated Aug. 12, 2019.
Non-Final Office Action for U.S. Appl. No. 15/396,475 dated Aug. 8, 2019.
Non-Final Office Action for U.S. Appl. No. 15/396,624 dated Oct. 16, 2019.
Supplemental Notice of Allowance for U.S. Appl. No. 15/396,624 dated Aug. 14, 2019.
Non-Final Office Action for U.S. Appl. No. 16/128,104 dated Aug. 21, 2019.
Advisory Action for U.S. Appl. No. 15/396,468 dated Jan. 16, 2020.
Advisory Action for U.S. Appl. No. 15/986,361 dated Feb. 26, 2020.
Advisory Action for U.S. Appl. No. 15/986,451 dated Feb. 20, 2020.
Final Office Action for U.S. Appl. No. 15/396,475 dated Feb. 4, 2020.
Final Office Action for U.S. Appl. No. 15/986,361 dated Dec. 23, 2019.
Final Office Action for U.S. Appl. No. 15/986,451 dated Dec. 16, 2019.
Final Office Action for U.S. Appl. No. 15/988,241 dated Jan. 8, 2020.
Non-Final Office Action for U.S. Appl. No. 15/396,468 dated Feb. 4, 2020.
Non-Final Office Action for U.S. Appl. No. 15/986,406 dated Dec. 18, 2019.
Non-Final Office Action for U.S. Appl. No. 15/986,286 dated Nov. 29, 2019.
Non-Final Office Action for U.S. Appl. No. 15/988,308 dated Dec. 3, 2019.
Non-Final Office Action for U.S. Appl. No. 15/988,472 dated Dec. 27, 2019.
Non-Final Office Action for U.S. Appl. No. 15/988,492 dated Feb. 18, 2020.
Non-Final Office Action for U.S. Appl. No. 16/229,310 dated Nov. 29, 2019.
Non-Final Office Action for U.S. Appl. No. 16/229,497 dated Dec. 12, 2019.
Non-Final Office Action for U.S. Appl. No. 16/230,268 dated Jan. 8, 2020.
Non-Final Office Action for U.S. Appl. No. 16/234,870 dated Jan. 9, 2020.
Non-Final Office Action for U.S. Appl. No. 16/236,673 dated Jan. 10, 2020.
Notice of Allowance for U.S. Appl. No. 16/128,104 dated Dec. 12, 2019.
Restriction Requirement for U.S. Appl. No. 16/231,467 dated Feb. 5, 2020.
Advisory Action for U.S. Appl. No. 15/396,475 dated May 13, 2020.
Corrected Notice of Allowance for U.S. Appl. No. 15/988,241 dated May 8, 2020.
Corrected Notice of Allowance for U.S. Appl. No. 16/128,104 dated Apr. 15, 2020.
Corrected Notice of Allowance for U.S. Appl. No. 16/128,104 dated May 20, 2020.
Final Office Action for U.S. Appl. No. 15/988,308 dated May 6, 2020.
Final Office Action for U.S. Appl. No. 15/986,286 dated Jun. 9, 2020.
Final Office Action for U.S. Appl. No. 15/986,406 dated May 26, 2020.
Final Office Action for U.S. Appl. No. 15/988,492 dated May 28, 2020.
Final Office Action for U.S. Appl. No. 16/229,310 dated Jun. 11, 2020.
Final Office Action for U.S. Appl. No. 16/229,497 dated Jun. 11, 2020.
Final Office Action for U.S. Appl. No. 16/230,268 dated Apr. 17, 2020.
Non-Final Office Action for U.S. Appl. No. 15/986,451 dated Apr. 16, 2020.
Non-Final Office Action for U.S. Appl. No. 16/229,614 dated Mar. 19, 2020.
Non-Final Office Action for U.S. Appl. No. 16/235,445 dated Apr. 2, 2020.
Non-Final Office Action for U.S. Appl. No. 16/236,713 dated May 29, 2020.
Notice of Allowability for U.S. Appl. No. 15/986,361 dated May 15, 2020.
Notice of Allowance for U.S. Appl. No. 15/986,361 dated Apr. 8, 2020.
Notice of Allowance for U.S. Appl. No. 15/988,241 dated Mar. 18, 2020.
Notice of Allowance for U.S. Appl. No. 16/231,467 dated Apr. 16, 2020.
Notice of Allowance in U.S. Appl. No. 16/236,673 dated May 1, 2020.
Corrected Notice of Allowance for U.S. Appl. No. 15/988,241 dated Aug. 13, 2020.
Corrected Notice of Allowance for U.S. Appl. No. 15/988,241 dated Jun. 22, 2020.
Corrected Notice of Allowance for U.S. Appl. No. 16/128,104 dated Jul. 8, 2020.
Corrected Notice of Allowance for U.S. Appl. No. 16/236,673 dated Sep. 21, 2020.
Final Office Action for U.S. Appl. No. 15/988,572 dated Jul. 2, 2020.
Final Office Action for U.S. Appl. No. 16/229,614 dated Jul. 9, 2020.
Final Office Action for U.S. Appl. No. 16/234,870 dated Jul. 9, 2020.
Final Office Action for U.S. Appl. No. 16/235,445 dated Sep. 3, 2200.
Non-Final Office Action for U.S. Appl. No. 15/396,475 dated Aug. 6, 2020.
Non-Final Office Action for U.S. Appl. No. 15/988,308 dated Sep. 8, 2020.
Non-Final Office Action for U.S. Appl. No. 15/988,492 dated Sep. 10, 2020.
Notice of Allowability for U.S. Appl. No. 15/986,361 dated Aug. 18, 2020.
Notice of Allowability for U.S. Appl. No. 15/986,361 dated Jul. 14, 2020.
Notice of Allowance for U.S. Appl. No. 15/986,218 dated Jul. 13, 2020.
Notice of Allowance for U.S. Appl. No. 15/988,241 dated Aug. 26, 2020.
Notice of Allowance for U.S. Appl. No. 16/230,268 dated Aug. 24, 2020.
Notice of Allowance for U.S. Appl. No. 16/234,870 dated Aug. 19, 2020.
Corrected Notice of Allowance for U.S. Appl. No. 16/230,268 dated Oct. 9, 2020.
Corrected Notice of Allowance for U.S. Appl. No. 16/231,467 dated Oct. 1, 2020.
Final Office Action for U.S. Appl. No. 15/986,451 dated Sep. 29, 2020.

(56) References Cited

OTHER PUBLICATIONS

Final Office Action for U.S. Appl. No. 16/236,713 dated Sep. 30, 2020.
Non-Final Office Action for U.S. Appl. No. 16/902,775 dated Oct. 5, 2020.
Notice of Allowability for U.S. Appl. No. 15/986,361 dated Sep. 30, 2020.

* cited by examiner

CONCURRENT PRESENTATION OF NON-PROGRAMMING MEDIA ASSETS WITH PROGRAMMING MEDIA CONTENT AT CLIENT DEVICE

CROSS-REFERENCE TO RELATED APPLICATIONS/INCORPORATION BY REFERENCE

This application makes reference to, and claims priority to, and claims benefit from U.S. Application Ser. No. 62/511,190, which was filed on May 25, 2017.

This Application also makes reference to:
U.S. application Ser. No. 15/988,241, filed on May 24, 2018;
U.S. application Ser. No. 15/986,361, filed on May 22, 2018;
U.S. application Ser. No. 15/986,406, filed on May 22, 2018;
U.S. application Ser. No. 15/988,308, filed on May 24, 2018;
U.S. application Ser. No. 15/988,492, filed on May 24, 2018; and
U.S. application Ser. No. 15/988,572, filed on May 24, 2018.

Each of the above stated patent applications is hereby incorporated herein by reference in its entirety.

FIELD OF TECHNOLOGY

Certain embodiments of the present disclosure relate to automated media presentation system(s). More specifically, certain embodiments of the present disclosure relate to concurrent presentation of non-programming media assets and programming media content at a client device.

BACKGROUND

Recent advancements in the television and broadcasting industry has led to development of various communication technologies and broadcasting platforms. Such communication technologies and broadcasting platforms are revolutionizing the way channel content is generated and presented to users. Currently, there is massive competition amongst the broadcasting platforms that are striving to increase their visual appeal in order to gain wider audience. The television viewing market is no longer exclusively concerned with whether channel content is viewed on a dedicated television or another device capable of consuming the channel content. Due to penetration of new technologies in the television and broadcasting sector, it is evident that the success of television broadcasting will be dependent on the ability of the network provider to gain access to the channel content demanded by the users, and to differentiate their offering from that of incumbent broadcasters or find new modes of content delivery.

Increased competition has led the broadcast providers (or the network providers) to differentiate their offering and provide services that may concurrently handle multiple channels. However, this has resulted in unparalleled levels of system complexity at the servers of the broadcast providers, which requires installation of large infrastructures and resources to handle and maintain uninterrupted content delivery for existing channel and also meet the ever increasing demand for content. Therefore, an advanced system may be required that facilitates the client-side device with the capability to provide enhanced viewer experience, thereby increasing their appeal in order to gain wider audience.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

Systems and/or methods are provided for concurrent presentation of media assets and programming media content at a client device, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE DISCLOSURE

Figure 1:
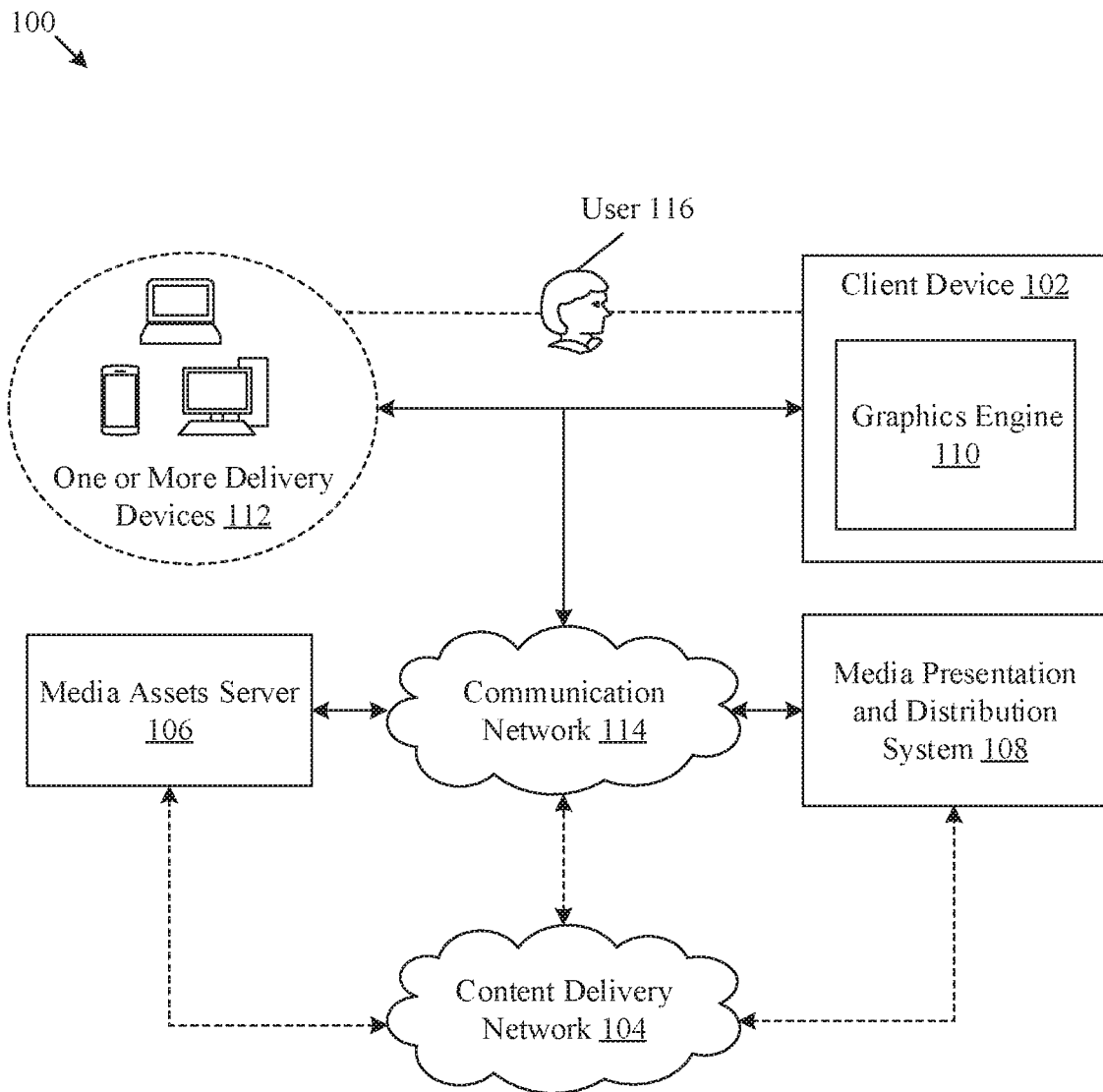
FIG. 1 is a block diagram that illustrates an exemplary network environment for client-side concurrent presentation of non-programming media assets and programming media content, in accordance with various exemplary embodiments of the present disclosure.

In accordance with an aspect, certain embodiments of the present disclosure may be found in a method and system for concurrent presentation of non-programming media assets and programming media content at a client device, which provides client-side dynamic presentation of at least one non-programming media asset with a first media stream. Various embodiments of the present disclosure may provide a system that may include a first plurality of circuits in a client device. The first plurality of circuits in the client device may be configured to transmit a request to a media presentation and distribution system. The request may comprise at least one preference for programming media content and such request may be provided by a user, via the client device.

In response to the received request from the client device, the media presentation and distribution system that comprises a second plurality of circuits may be configured to transmit the requested first media stream to the client device. The transmitted first media stream may comprise the programming media content and at least one tag associated with the programming media content. At least one occurrence of at least one event opportunity point within the programming media content may be received from the client device. Such at least one event opportunity point may correspond to, but not limited to, a specified event that may correspond to at least one of start credits, end credits, lull points, time-based marked regions, location-based marked regions, context-based marked regions, explicit scene start and end, and product placement opportunities, within the programming media content. For example, (i.e., coffee scene, crying scene, action sequence, etc.), explicit scene start/end, product placement opportunities, and the like.

The first media stream and the second media stream may be transmitted at the client device as concurrent media streams, and each of the first media stream and the second media stream may be managed concurrently via at least one independent thread at the client device.

The media presentation and distribution system, via the second plurality of circuits, may receive the at least one occurrence of the at least one event opportunity point based on the at least one tag associated with the programming media content. The at least one event opportunity point may be responded by the media presentation and distribution system, based on a defined criteria to respond over the the at least one event opportunity point.

The client device, in conjunction with the first plurality of circuits may be configured to modify a display view of the client device with at least one modification for a defined duration. Such at least one modification may be performed for the selected at least one event opportunity point within the programming media content of the first media stream. The at least one tag within the programming media content may specify the at least one modification in the display view at the client device.

The client device, in conjunction with the first plurality of circuits may be configured to present the at least one non-programming media asset, from a second media stream for the defined duration, concurrently with the programming media content from the first media stream over the at least one modified display view of the client device. Such concurrent presentation of programming media content from the first media stream and the at least one non-programming media asset from the second media stream may increase a likelihood of a user engagement, associated with the client device, with the at least one non-programming media asset. Such likelihood of engagement may be improved based on a targeted selection of the at least one event opportunity point that may further improve an attention span of the user for engagement with the programming media content and the at least one non-programming media asset at the client device.

In accordance with an embodiment, the at least one tag with the programming media content may correspond to a client manifest stored at the client device. In accordance with an embodiment, the transmission of the first media stream or the second media stream to the client device may be performed via one of an HTTP Live Streaming (HLS) technique, a Dynamic Adaptive Streaming over HTTP (DASH) technique, or any suitable digital streaming protocol.

In accordance with an embodiment, the request transmitted from the client device may comprise the at least one preference for a personalized playlist of at least one program. In accordance with an embodiment, the at least one modification in the display view of the client device may include, but is not limited to, a squeeze-back of the programming media content to a defined region within the display view, an overlay over the defined region within the display view or a split view of the display view. The modification in the display view of the client device is personalized based on a retrieved set of user-preferences for the user.

The defined criteria for the selection of the at least one event opportunity point may be based on at least one of, or a combination thereof, but not limited to, retrieved set of user-preferences, at least one defined goal, a measured attention of the user associated with the client device, a time constraint, an inventory constraint, and a user-defined constraint.

In accordance with another aspect, certain embodiments of the present disclosure may be found in a method and system for client-side dynamic presentation of at least one non-programming media asset at a client device. Various embodiments of the present disclosure may provide a system that may include a second plurality of circuits in a media presentation and distribution system. The second plurality of circuits in the media presentation and distribution system may be configured to transmit a first media stream to a client device in response to a request received from the client device. The requested first media stream may comprise programming media content and at least one tag associated with the programming media content.

The second plurality of circuits may be configured to receive, from the client device, at least one occurrence of at least one event opportunity point within the programming media content based on the at least one tag associated with the programming media content. Such at least one occurrence of the at least one event opportunity point within the programming media content may be identified by the client device.

The second plurality of circuits may be configured to respond to the at least one event opportunity point received from the client device. Such response of the at least event opportunity point may be based on a defined criteria and may correspond to a specified event within the programming media content. The second plurality of circuits may be configured to control at least one modification in a display view at the client device for a defined duration for the selected at least one event opportunity point within the programming media content of the first media stream.

The second plurality of circuits may be configured to instruct presentation of the at least one non-programming media asset, from a second media stream for the defined duration, concurrently with the programming media content from the first media stream over the at least one modified display view of the client device. Such concurrent presentation of programming media content from the first media stream and the at least one non-programming media asset from the second media stream may increase a likelihood of an engagement of a user, associated with the client device, with the at least one non-programming media asset. Such likelihood of engagement may be improved based on a targeted selection of the at least one event opportunity point that may further improve an attention span of the user for engagement with the media content and the at least one non-programming media asset at the client device.

In accordance with an embodiment, the second plurality of circuits may be configured to verify an enablement of the at least one modification in the display view of the client device and the presentation of the at least one non-programming media asset within the modified display view or an unmodified display view at the client device.

In accordance with an embodiment, the second plurality of circuits in the media presentation and distribution system may be configured to determine a context of the programming media content in the first media stream. A corresponding context of the at least one non-programming media asset may be further determined in the second media stream that is to be selected for the concurrent presentation with the programming media content. The second plurality of circuits in the media presentation and distribution system may be further configured to select the at least one non-programming media asset in the second media stream for the concurrent presentation with the programming media content based on the determined context of the programming media content and the corresponding context of the at least one non-programming media asset.

In accordance with an embodiment, the second plurality of circuits in the media presentation and distribution system may be configured to retrieve a set of user-preferences for the user associated the client device, and select the at least one non-programming media asset for the concurrent presentation with the programming media content in the first media stream based on the retrieved set of user-preferences.

In accordance with an embodiment, the second plurality of circuits in the media presentation and distribution system may be configured to determine the at least one event opportunity point within the programming media content, and insert the at least one tag at the determined at least one event opportunity point within the programming media content based on the received request from the client device. In accordance with an embodiment, the determination of the at least one event opportunity point may be based on content recognition of the programming media content within the first media stream. In accordance with another embodiment, the determination of the at least one event opportunity point may be based on semantic or context mining of a context of the programming media content in the first media stream.

In accordance with an embodiment, the second plurality of circuits in the media presentation and distribution system may be configured to generate at least one notification based on a defined set of rules for the at least one event opportunity point within the programming media content and thereafter, transmit the generated at least one notification to at least the client device or at least one delivery platform associated with the client device. The defined set of rules for generation of the at least one notification may include, but are not limited to, user-defined constraint, client-device constraints, defined goal of impressions, reach or views, a defined time of generation of the at least one notification, and a specified type of the at least one notification. In accordance with an embodiment, the second plurality of circuits in the media presentation and distribution system may be configured to receive a request based on a response from the user over the transmitted at least one notification at the client device or the at least one delivery platform, and instruct presentation of the at one non-programming media asset for the received request from the user. The at least one notification may be generated in response to the presentation of the at least one non-programming media asset at the selected at least one event opportunity point within the programming media content in the first media stream.

FIG. 1 is a block diagram that illustrates an exemplary network environment for client-side dynamic presentation of non-programming media assets with personalized programming media content, in accordance with various exemplary embodiments of the present disclosure. Such presentation of the at least one non-programming media asset, for example, advertisements, and promos, may be performed to facilitate seamless engagement of users with targetable non-programming media assets that may be personalized for the users over a personalized On-Demand media delivery platform on client devices. Referring to FIG. 1, there is shown a network environment 100 that includes a client device 102, a content delivery network (CDN) 104, a media assets server 106, a media presentation and distribution system 108, and one or more delivery devices 112, communicatively coupled to a communication network 114. Additionally, FIG. 1 illustrates a user 116 associated with the client device 102 and the one or more delivery devices 112.

The client device 102 may comprise suitable logic, circuitry, and interfaces that may be configured to execute operations that pertain to the concurrent presentation of the one or more non-programming media assets (for example, graphical or video ads, or overlay ads) with the programming media content (for example, television programming or On-demand shows) at a display view of the client device 102. The operations may be performed by a graphical processing unit (GPU) or a computational circuitry in the client device 102 to obtain encoded one or more non-programming media assets or encoded programming media content for concurrent presentation within the display view. The client device 102 may facilitate playback of the one or more non-programming media assets and the programming media content via a display device, such as televisions, laptops, or desktops, which may be a peripheral device or may be integrated with the client device 102.

The client device 102 may be further configured to request a first media stream of the programming media content from the media presentation and distribution system 108 and receive a second media stream of the one or more non-programming media assets from the media presentation and distribution system 108 for concurrent presentation with the programming media content of the first media stream. Examples of the client device 102 may include, but are not limited to, a Set-Top-Box (STB), an IPTV, a hybrid box, a cable converter, a smartphone, a laptop, and a tablet. The client device 102 may be associated with a device identifier that may be a unique identifier for the user 116 associated with client device 102. Such device identifier may be used by the media presentation and distribution system 108 to discretely personalize delivery of the programming media content and the one or more non-programming media assets at the client device 102.

Examples of such device identifier may include, but are not limited to, an International Mobile Equipment Identity (IMEI) number, Android ID, Apple ID, Advertising Identifier (IDFA), Advertising Identifier (AID), Unique Device Identifier (UDID), mobile number, and MacID. An electronic program guide (EPG) may be enabled on the client device 102 to facilitate the user 116 to switch to different programming media content in accordance with a specified user-preference. The client device 102 may receive the first media stream of the programming media content and the second media stream of the one or more non-programming media assets, via a distribution channel, for example, an internet-based television network. The graphics engine 110 may be configured on the client device 102 and may be communicatively coupled to a display circuitry of the display device. It may be noted that the graphics engine 110 may be shown to be integrated with the client device 102 in FIG. 1. However, the graphics engine 110 may be present on a cloud or a remote application server and communicatively coupled with the client device 102, without deviation from the scope of the disclosure.

The CDN 104 may comprise suitable logic, circuitry, and interfaces that may be configured to store at least one segment of the programming media content and distribute the stored at least one segment of the programming media content to the media presentation and distribution system 108. Accordingly, the CDN 104 may be configured to facilitate delivery of one or more programs as the programming media content to a plurality of users, such as the user 116. The CDN 104 may serve as a distributed network of media servers, which may serve as a curated repository of programs (encoded or uncompressed), for distribution to the media presentation and distribution system 108.

The CDN 104 may be configured to distribute the at least one segment of the programming media content, via one or more media access platforms (such as broadcast, live and IP-based platforms) to the media presentation and distribution system 108. The CDN 104 may manage resources for a delivery channel that may be characterized by a frequency band for a broadcast delivery channel or an internet protocol address (IP address) for an IP-based delivery channel. Examples of the delivery channel may include, but are not limited to, a television channel, a radio channel, a webcasting channel, and an IP-based channel that may be hosted on a webpage or an application.

The one or more media access platforms may include a Video-On-Demand (VOD) platform that distributed programming media content via at least an over-the-air content delivery/distribution network, a linear content delivery/distribution network, an Internet Protocol (IP) based content delivery/distribution network, and/or the like. The CDN 104 may include a distributed and networked chain of one or more media servers, media packagers, media asset managers, media ingesters, encoder/decoders, processing engines, schedulers, and subscription management and payment systems.

The CDN 104 may be further associated with a VOD media source that may store and distribute the at least program as a VOD media stream to the media presentation and distribution system 108. Such VOD media stream may correspond to on-demand programming media content personalized for the user 116, for example, movies, music videos, and clips of various shows or programs that may be requested or viewed on-demand by the user 116. The VOD media source may be communicatively coupled with the CDN 104 to listen to requests from the media presentation and distribution system 108. Accordingly, the VOD media source may provide the at least one segment of the at least one program. The VOD media source may store VOD media data, which may be associated with a storage standard, for the at least one program. The storage standard may be defined by a specified format, for example ISO/IEC 13818-1 (MPEG-2). A closed caption data and one or more inbound triggers for the at least one program may be stored in the VOD media source. The at least one program may be associated with VOD program data that may include a VOD media content identifier, a title of the VOD media content, a summary of the VOD media content, a file format, encryption information, length, date and/or time of addition to a catalogue, a new content indicator for the at least one program (e.g., a new VOD asset that became available within the last 24 hours, last few days, last week, and/or the like), and a media content class. Examples of the media content class may include, but are not limited to, a television show, a cartoon program, a movie, a news media, an episode, a game, a clip, a recorded sports event, and an interactive media.

The media assets server 106 may comprise suitable logic, circuitry, and interfaces that may be configured to store the one or more non-programming media assets, such as videos or graphics of advertisements, logos, bugs (also referred to as digital on-screen graphics similar to a logo), and promos, and provide the stored one or more non-programming media assets to the media presentation and distribution system 108. Such one or more non-programming media assets may be selected by the media presentation and distribution system 108 to personalize the delivery of the one or more non-programming media assets and the programming media content. The media assets server 106 may also store an attribute database of the one or more non-programming media assets. In accordance with measured and/or estimated preferences of the user 116, context of the at least one segment of the programming media content, or a demographic criteria (for example, age, gender and region), the media assets server 106 may provide the one or more non-programming media assets to a media packager or an asset store within the media presentation and distribution system 108. Records of the one or more non-programming media assets to be presented at the client device 102 may be managed for linear pre-scheduled media streams as well as the VOD media streams. The media assets server 106 may be part of a media asset network that may be associated with one or more media asset promoters, such as advertisers, or media asset owners. A repository of the one or more non-programming media assets may be managed by the media assets server 106, in which each non-programming media asset may correspond to a promotional content for an offering, such as a product offering or a service offering. Each of the one or more non-programming media assets in the media stream may be associated with at least an identifier, a playback start time, a playback end time, a media asset format, a file size, a resolution, and a codec. In accordance with an embodiment, each non-programming media asset may be characterized as a promotional advertisement and the corresponding identifier may be an advertisement identifier (Ad-ID). In accordance with an embodiment, each non-programming media asset may be characterized as a promotional advertisement and the corresponding identifier may be a web, image or audio-based beacon that may be present with the corresponding non-programming media asset. The one or more non-programming media assets may correspond to a promotional content that includes at least one of a graphic asset, a textual asset, an audio asset, a video asset, and an animated asset. The one or more operations of the media assets server 106 may be shared or managed by the CDN 104 or the media presentation and distribution system 108, without deviation from the scope of the present disclosure.

The media presentation and distribution system 108 may comprise suitable, logic, circuitry, and interfaces that may be configured to manage operations of the client device 102 for concurrent presentation of the one or more non-programming media assets and programming media content, requested by the user 116. Examples of the one or more non-programming media assets may include, but are not limited to advertisements, logos, channel bugs, and promos. The media presentation and distribution system 108 may be configured to process each request with at least one user-preference for the programming media content to deliver the programming media content that matches the at least one user-preference. The media presentation and distribution system 108 may be further configured to manage various requirements specified within the request and deliver the programming media content and the one or more non-programming media assets to ensure a seamless engagement and viewership experience of the user 116 with the programming media content and the one or more non-programming media assets. For such management, the media presentation and distribution system 108 may be configured to optimally distribute operations across sub-processing units of the media presentation and distribution system 108 and the client device 102. The media presentation and distribution system 108 may retrieve the programming media content from internally managed content stores, content delivery networks, or asset stores for an optimal delivery of the programming media content and the one or more non-programming media assets at the client device 102. The programming media content may be provided by the media presentation and distribution system 108 as a first media stream to the client device 102, via a distribution service. The distribution service may be at least one of a unicast, multicast, broadcast, or simulcast service. An encoder at the media presentation and distribution system 108 may encode the first media stream using an adaptive bitrate streaming (ABR) technique in accordance with an availability of network bandwidth for the client device 102. Examples of the ABR technique may include, but are not limited to, HTTP Dynamic Streaming (HDS), Dynamic Adaptive Streaming Over HTTP (DASH), "Smooth", "Progressive" and "HTTP Live Streaming" (HLS) streaming techniques. The operations of the media presentation and distribution system 108 may be shared with the CDN 104 of the network environment 100, without a deviation from the scope of the present disclosure.

The graphics engine 110 may comprise suitable logic, circuitry, and interfaces that may be configured to perform graphical computations for concurrent presentation of the one or more non-programming media assets and the programming media content. Such graphical computations may be performed by the graphics engine 110, in conjunction with computational resources of a GPU. The graphics engine 110 may utilize the computational resources of the GPU to perform modifications in the display view of the client device 102, encoding of the one or more non-programming media assets or the programming media content, or rasterizing overlay graphics (such as, logos or bugs) over selected frames of the programming media content. At least a media encoder and a media decoder may be present in the graphics engine 110 that may be programmatically configured via a defined circuitry to operate on the programming media content and the one or more non-programming media assets. The graphics engine 110 may be invoked to execute such graphical operations to manage the display view of the programming media content and the presentation of the programming media content and the one or more non-programming media assets within (or over) the programming media content.

The one or more delivery devices 112 may comprise suitable logic, circuitry, and interfaces that may be configured to receive and/or serve at least one notification or promotional content, via at least one delivery platform accessible on the one or more delivery devices 112. The one or more delivery platforms may correspond to a communication exchange platform that may incorporate visual, audible, or executable data to provide at least one notification or associated promotional content to the user 116. Example of the one or more delivery platforms may include, but are not limited to, an e-mail, a mobile messaging platform, a webpage, a podcast, and a push notification. The promotional content or the at least one notification may be received at the one or more delivery platforms on the one or more delivery devices 112 in order to notify the user 116 about engagements with the programming media content and the presented one or more non-programming media assets. For example, a user (X) engaged in a music listening activity in a music application of a mobile device may hear a promotional sound clip that may recite the product offerings or service offering to the user (X). Alternatively, the user (X) may receive a notification or a pop-up message that includes a personalized list of watched non-programming media assets with the programming media content. The promotional content may include one or more promotional items, each of which may correspond to an advertisement for a product, service, cause or the programming media content. The promotional content may be present in one or more formats. The one or more formats of the promotional content may be present to suitably target each of the one or more delivery platforms. Examples of the one or more formats may include, but are not limited to, a video format, an audio format, a text format, an image format, or a suitable programmable or non-programmable format. The promotional content may correspond to an interactive selectable item such that each selection may be recorded as part of a select stream for the corresponding user 116. Additionally, views or intent to select may be recorded as impressions, page redirections, or commercial sale on a redirected page recorded in real-time.

The communication network 114 may comprise suitable logic, circuitry, and interfaces that may be configured to provide a plurality of network ports and a plurality of communication channels for transmission and reception of the communication data. The communication data may correspond to data received and/or exchanged, via the communication network 114, among the media presentation and distribution system 108, the CDN 104, the media assets server 106, and the client device 102. Each network port may correspond to a virtual address (or a physical machine address) for transmission and reception of the communication data. For example, the virtual address may be an Internet Protocol version 4 (IPV4) or an Internet Protocol version 6 (IPV6) address, and the physical address may be a media access control (MAC) address. An application layer may be associated with the communication network 114 for implementation of communication protocols on one or more communication requests from at least one of the one or more computing devices. The communication data may be transmitted or received via a communication protocol. Examples of the communication protocol may include, but are not limited to, a Hypertext Transfer Protocol (HTTP), a File Transfer Protocol (FTP), a Simple Mail Transfer Protocol (SMTP), a Domain Name Server (DNS) protocol, and a Common Management Information Protocol (CMIP) Over Transmission Control Protocol/Internet Protocol TCP/IP (CMOT).

The communication data may be transmitted or received via at least one communication channel of the plurality of communication channels. The communication channels may include, but are not limited to, a wireless channel, a wired channel, a combination of wireless and wired channel thereof. The wireless or wired channel may be associated with a data standard which may be defined by one of a Local Area Network (LAN), a Personal Area Network (PAN), a Wireless Local Area Network (WLAN), a Wireless Sensor Network (WSN), a Wireless Area Network (WAN), and a Wireless Wide Area Network (WWAN). Additionally, the wired channel may be selected on the basis of bandwidth criteria. For example, an optical fiber channel may be used for a high bandwidth communication, and a coaxial cable (or Ethernet-based communication channel) may be used for moderate bandwidth communication. In one scenario, the communication network 114 may be an internet based network. For such networks, a broadcast standard may be used, for example, National Television System Committee (NTSC), (Phase Alternating Line) PAL, Sequential Color with Memory (SECAM), Moving Picture Experts Group (MPEG), and (Digital Video Broadcasting) DVB-S/DVB-S2 or (Integrated Services Digital Broadcasting) ISDB-S.

Although, only a single communication network has been illustrated in FIG. 1, there may be more than one communication networks that may or may not share resources to optimally deliver programming content and other non-programming content to various connected client devices.

In operation, a user may transmit a request, via a control mechanism of the client device 102, to a media presentation and distribution system 108 for presentation of the programming media content. The request may be associated with at least one user-preference for the programming media content and may correspond to personalization of the programming media content, for example, VOD media content. The request may be received by the media presentation and distribution system 108, via the communication network 114. In accordance with an embodiment, the request to present the programming media content may be transmitted to an application server of the client device 102, which may transmit the request to the media presentation and distribution system 108, via the communication network 114. An application engine (not shown), at the client device 102, may further request authentication of the request to present the media stream from the media presentation and distribution system 108. The request may correspond to an HTTP-based request via a transfer protocol, for example, HLS for an internet-based media distribution channel.

The media presentation and distribution system 108 may authenticate the request from the client device 102 and may store the requested at least one user-preference for the programming media content. A search for an available one or more programs may be identified by the media presentation and distribution system 108 to deliver the programming media content in accordance with the at least one user-preference.

For example, a user, "Phil" may request the media presentation and distribution system 108 to present the programming media content associated with "Comedy" and "Thriller" genre. A search for one or more programs that may have "Comedy" or "Thriller" genre may be performed and the available comedy programs or thriller programs may be selected for delivery by the media presentation and distribution system 108.

Based on the search for the available one or more programs, the media presentation and distribution system 108 may generate a personalized playlist of the one or more programs that may be transmitted as a first media stream (or VOD stream) to the client device 102. Such playlist may be personalized for the provided one or more preferences of the user 116. The media presentation and distribution system 108 may schedule a playout of each program within the personalized playlist. During such scheduling, the media presentation and distribution system 108 may retrieve the programming media content for the generated playlist from the CDN 104 of at least one media network. The retrieved programming media content comprises the scheduled one or more programs, which may include encoded or raw uncompressed programs. Such raw uncompressed programs may be encoded by the media presentation and distribution system 108 in accordance with a distribution or delivery protocol for the client device 102. Additionally, rights, such as digital rights, for the retrieved one or more programs may be validated to enable packaging of the retrieved one or more programs as the programming media content. A tagging service may be enabled within the media presentation and distribution system 108 to insert at least one tag (hereinafter, "one or more tags") at an event opportunity point determined within the programming media content of the one or more programs.

In one implementation, the tagging service may enable a media analysis service within the media presentation and distribution system 108 to determine the at least one event opportunity point (hereinafter, "one or more event opportunity points") within the scheduled programming media content for the user 116. In another implementation, the media analysis service may identify opportunity points within the programming media content and enable the tagging service to generate tags for the identified opportunity points within the programming media content. The determined one or more event opportunity points within the scheduled programming media content may correspond to a specified event within the programming media content. Such specified event within the programming media content may correspond to, but not limited to, start credits, end credits, lull points, time-based marked regions, location-based marked regions, context-based marked regions, explicit scene start and end, and product placement opportunities, within the programming media content. For each of the determined one or more event opportunity points within the programming media content, metadata may be stored within the media presentation and distribution system 108 and transferred to the tagging service of the media presentation and distribution system 108. The tagging service of the media presentation and distribution system 108 may be configured to generate and insert the one or more tags at the determined one or more event opportunity points within the programming media content. Such generation and insertion may be based on the received metadata for each of the one or more determined event opportunity points within the programming media content. The one or more tags may correspond to a client manifest that may be created by the media presentation and distribution system and transmitted to the client device. The client manifest may be interpreted at the client device. The one or more tags may be represented by at least one of a signal, a beacon, a SCTE-35 message, a marker, textual information, binary information, visual information, aural information in the first media stream, and the like. Each tag of the one or more tags may include, but is not limited to, at least a pointer for a defined playback duration of a corresponding event opportunity point, a modification in a display view the defined playback duration, and a descriptor or pointer to a corresponding non-programming media asset to be presented within the playback duration of the corresponding event opportunity point.

The scheduled one or more programs in the generated playlist may be packaged with the one or more tags, at the determined one or more event opportunity points within the programming media content, to obtain a packaged programming media content. The packaged programming media content may be encapsulated on a transport media stream, such as an MPEG-2 stream, which may be referred to as the first media stream of the programming media content. Additionally, the media presentation and distribution system 108 may generate at least one segment of the first media stream prior to a playout of the first media stream to the client device 102. Metadata of the at least one segment of the first media stream and the one or more tags may be stored as client manifest within the media presentation and distribution system 108. The transport media stream, as the first media stream of the programming media content, and the client manifest may be transmitted to the client device 102.

The client device 102 may be configured to receive the first media stream of the programming media content and the client manifest transmitted by the media presentation and distribution system 108. The received first media stream may be encoded and encrypted with a defined encoding technique or encryption technique. Such received media stream may be decrypted and decoded at the client device 102. The client device 102 may utilize the computational resources of the graphics engine 110 to decode each frame of the programming media content within the media stream. As the programming media content within the first media stream gets decoded at the client device 102, the one or more tags within the programming media content may be identified by the client device 102. Each of the one or more tags may point to a corresponding event opportunity point within the programming media content and may determine a corresponding modification in the display view of the client device 102 with the playback of the programming media content. In addition, each tag may specify one or more non-programming media assets for concurrent playback with the programming media content, at the corresponding event opportunity point, in the modified display view of the client device. A request may be transmitted by the client device 102 to the media presentation and distribution system 108 for selection of the one or more event opportunity points from at least one occurrence of the determined one or more event opportunity points.

The media presentation and distribution system 108 may receive, from the client device 102, the one or more occurrences of the one or more event opportunity points within the programming media content, as identified by the client device 102 based on the one or more tags associated with the programming media content. The media presentation and distribution system 108 may be configured to respond, based on a defined criteria, to the received one or more occurrences of the one or more event opportunity points. Such defined criteria may be determined based on at least one of, or a combination thereof, but not limited to, a retrieved set of user-preferences, at least one defined goal, a measured attention of the user 116 associated with the client device 102, time constraints, inventory constraints, and user-defined constraints. In accordance with an embodiment, for each of the selected one or more event opportunity points, the media presentation and distribution system 108 may determine the corresponding modification in the display view of the client device 102 and the corresponding non-programming media asset for concurrent presentation at the client device 102.

The client device 102 may receive a response from the media presentation and distribution system 108 on each transmitted request for the selection of the one or more event opportunity points within the programming media content of the first media stream. The response may comprise the selected one or more event opportunity points for concurrent presentation of the one or more non-programming media assets during the playback of the programming media content from the first media stream. In response to the selection of the one or more event opportunity points, the client device 102 may request the media presentation and distribution system 108 to transmit a second media stream of the one or more non-programming media assets, via the communication network 114. In accordance with an embodiment, based on the request, the media presentation and distribution system 108 may fetch the one or more non-programming media assets, such as videos, or graphics of promotional content, from the media assets server 106. In accordance with an embodiment, the media presentation and distribution system 108 may retrieve the one or more non-programming media assets from internally managed assets stores. The one or more non-programming media assets may be packaged and encapsulated on a transport media stream, such as an MPEG-2 stream, which may be transmitted as the second media stream to the client device 102, via the communication network 114. As the client device 102 receives the second media stream, the graphics engine 110 may be triggered to encode each non-programming media asset in the second media stream and the programming media content within the first media stream. Each non-programming media asset may be encoded for playback at the determined event opportunity point within the programming media content for a defined duration, for example, 10 seconds of a movie trailer at the program start credit point. The client device 102 may be configured to receive the first media stream and the second media stream as concurrent media streams, and each of the first media stream and the second media stream may be managed concurrently via at least one independent thread at the client device 102.

In further response to the selection of the one or more event opportunity points, the client device 102 may modify a display view with the at least one modification (hereinafter, "one or more modifications") for the defined duration of the selected one or more event opportunity points within the programming media content. The one or more modifications in the display view of the client device 102 may be based on the one or more tags in the programming media content. The one or more modifications in the display view may include, but is not limited to, a squeeze-back of the programming media content to a defined region within the display view, an overlay over the defined region within the display view, and a partitioning of the display view. Each of such one or more modifications may be personalized for the user based on a set of user-preferences for the user 116.

The client device 102 may be configured to present each of the one or more non-programming media assets in the second media stream within the modified display view of the client device 102, and concurrently with the playback of programming media content in the first media stream. A separate thread within the process circuitry of the client device 102 may manage the decoding and playback of each non-programming media asset and the programming media content within the modified display view. The presentation of the programming media content may correspond to a parallel playback of each non-programming media asset and the programming media content within a partitioned or scaled region of the display view of the client device 102.

For example, for a program with end credits, a user may find such credit playback duration as of low interest and may switch to a different program. Such low interest period for the end credit playback may be considered as an event opportunity point and a tag may specify a modification, such as a squeeze back of the programming media content from a defined region of the programming media content to downscaled region within the display view of the client device 102. A remnant region within the display view may be partitioned and a promotional advertisement video and a trailer of an upcoming program may be populated within the partitioned regions of the display view. The promotional advertisement video and the trailer may be presented concurrently with the end credits such that the user 116 may seamlessly engage with the programming media content.

As the display view of the client device 102 is modified and the corresponding non-programming media asset is presented within the modified display view, the media presentation and distribution system 108, in conjunction with the client device 102, may be configured to verify enablement of the one or more modifications in the display view of the client device 102. The media presentation and distribution system 108, in conjunction with the client device 102, may be further configured to verify the presentation of the one or more non-programming media assets within the modified display view or an unmodified display view at the client device 102.

At least one notification may be generated at the media presentation and distribution system 108, based on a defined set of rules for the at least one event opportunity point within the programming media content. The defined set of rules for the generation of the one or more notifications may include, but are not limited to, user-defined constraints, client device constraints, defined goal of impressions, program reach or views, or a defined time of generation of the at least one notification. In other words, the defined set of rules may be based on constraints, for example, for a cap on a number of notifications, or a time for no-disturbance, provided by the user 116, or a network filter in the client device 102 that filters notifications, a sales or impressions goal of the promoters of the one or more non-programming media assets, and the like. For example a notification service may be triggered at a moment when a given piece of programming content may be encoded and available at the client device (based upon determined or explicitly entered user preference). Upon selection of options in a notification, the first media stream may be 'paused' and the stream associated with the notification may be played. The generated one or more notifications may be transmitted to at least the client device 102 or at least one delivery platform associated with the client device 102. Such at least one delivery platform may comprise emails, messages, webpages, podcasts and applications, which may be present in the one or more delivery devices 112 or the client device 102. As the one or more notifications are received at the client device 102 or the one or more delivery devices 112, the user 116 may interact with the one or more notifications. The interaction may result in generation of a response over the one or more notifications, which may be transmitted by the client device 102 or the one or more delivery devices 112 as a request to the media presentation and distribution system 108. In conjunction with the received request, the media presentation and distribution system 108 may instruct the presentation of the one or more non-programming media assets within the modified display view of the client device 102. For example, a notification that prompts the user 116 to provide whether the displayed "Car" in the modified view is of interest to the user 116. The user 116 may select "No" option from the notification and therefore, the media presentation and distribution system 108 may filter non-programming media assets that may be related to "Car". The detailed description of the operation of the client device 102 and the media presentation and distribution system 108 has been described in detail in FIG. 2A and FIG. 2B, respectively.

Figure 2A:
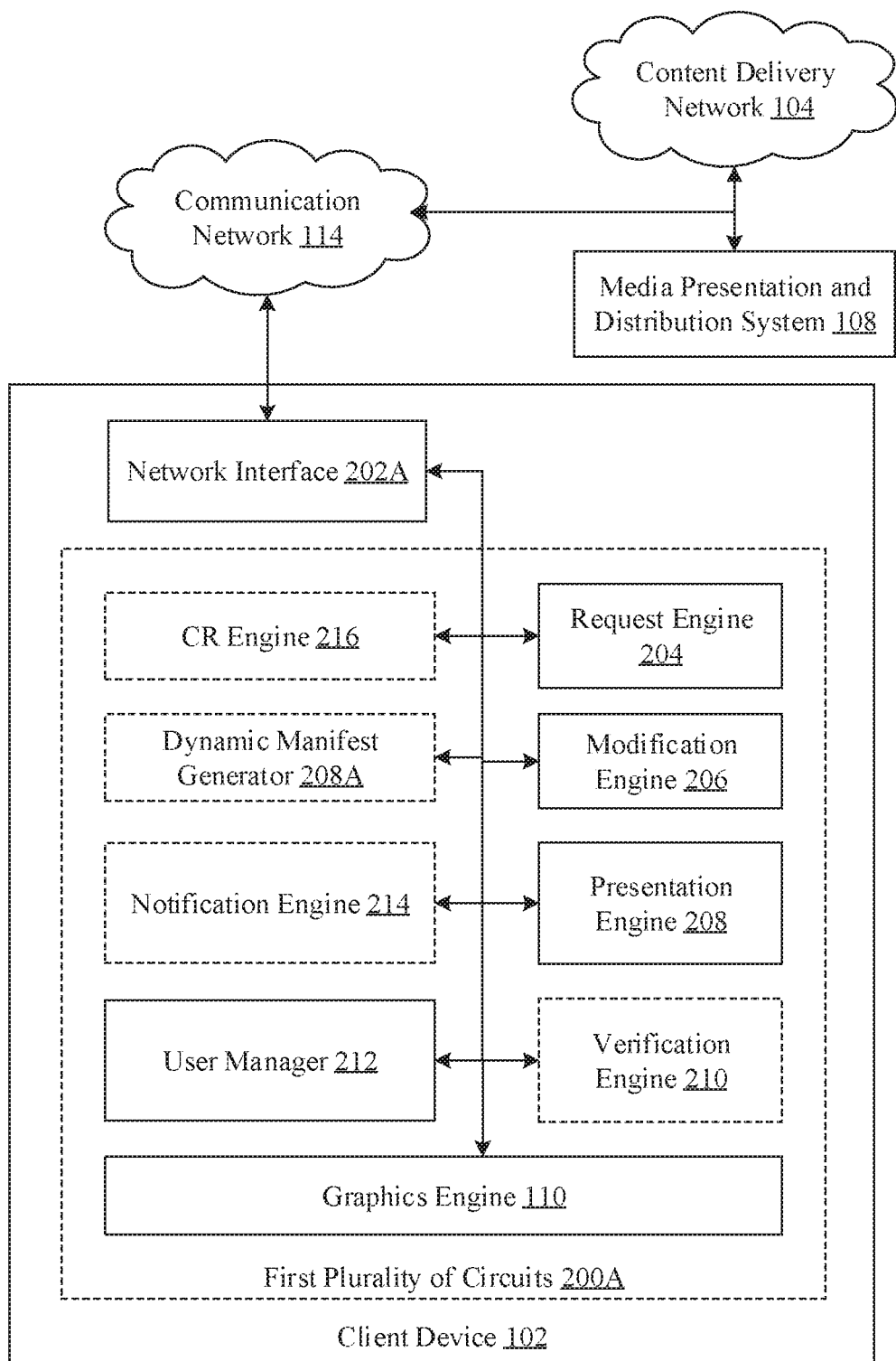
FIG. 2A is a block diagram that illustrates an exemplary client device for client-side concurrent presentation of non-programming media assets and programming media content, in accordance with an embodiment of the present disclosure.

FIG. 2A is a block diagram that illustrates an exemplary client device for client-side dynamic presentation of non-programming media assets with personalized programming media contents, in accordance with an exemplary embodiment of the present disclosure. Referring to FIG. 2A, there is shown the client device 102 that comprises a network interface 202, and a first plurality of circuits 200A. The first plurality of circuits 200A may include a request engine 204, a modification engine 206, a presentation engine 208, a verification engine 210, a user manager 212, a notification engine 214 and a content recognition (CR) engine 216 communicatively coupled with each other, via at least one bus or circuitry within the client device 102. The client device may additionally include a dynamic manifest generator 208A. The graphics engine 110 may be present as a resource of a GPU within the client device 102. The media presentation and distribution system 108 and the CDN 104 may be communicatively coupled, via the communication network 114, to the network interface 202A of the client device 102. Although not shown in FIG. 2A, the first plurality of circuits 200A may include one or more processors that may operate on instructions that may be stored in a memory present on the client device 102.

The network interface 202A may comprise suitable logic, circuitry, and interfaces that may be configured to communicate with various computing components within the client device 102. The network interface 202A may be implemented by use of known technologies to support wired or wireless communication of the various computing components of the client device 102 with peripheral components, such as the media presentation and distribution system 108 and the CDN 104. Components of the network interface 202A may include, but are not limited to, an antenna, a radio frequency (RF) transceiver, one or more amplifiers, a tuner, one or more oscillators, a digital signal processor, a coder-decoder (CODEC) chipset, and/or a local buffer circuitry.

The network interface 202A may comprise suitable logic, circuitry, and interfaces that may be configured to operate as a communication bridge between various components of the client device 102, the CDN 104, the media assets server 106, the one or more delivery devices 112 associated with the user 116, and various computing components of the client device 102. The network interface 202A may be implemented by use of known technologies to support wired or wireless communication of the various computing components of the client device 102 with peripheral components, such as the media presentation and distribution system 108, the CDN 104, the media assets server 106, and the one or more delivery devices 112 associated with the user 116. Additionally, the network interface 202A may operate as a switch or a router of communication signals to dedicated components of the client device 102. Components of the network interface 202A may include, but are not limited to, an antenna, an RF transceiver, one or more amplifiers, a tuner, one or more oscillators, a digital signal processor, a CODEC chipset, a subscriber identity module (SIM) card, and/or a local buffer.

The request engine 204 may comprise suitable logic, circuitry, and interfaces that may be configured to transmit at least one request to the media presentation and distribution system 108 and receive responses for the transmitted requests and, permissions and/or rights over the programming media content. The at least one request may be transmitted to perform at least one operation on the client device 102. The request engine 204 may be communicatively coupled to the network interface 202A that may be further coupled to an I/O interface (not shown) of the client device 102. The user 116, associated with the client device 102, may provide at least one interaction at a display view of the client device 102, via the I/O interface, such as a microphone, a keyboard, touch-screen, or a mouse pad. The network interface 202A may communicate the corresponding selection from/to the request engine 204. In response to the received at least one interaction, the request engine 204 may identify a request within the received at least one interaction and generate a corresponding request that may be defined as per a communication protocol specified for the client device 102 and other peripheral devices.

The modification engine 206 may comprise suitable logic, circuitry, and interfaces that may be configured to render the one or more modifications to a display view of the client device 102. The one or more modifications may be rendered with due utilization of graphical computation resources of the graphics engine 110 within the client device 102. Such modifications with the display view of the client device 102 may be rendered at the selected one or more event opportunity points, such as credit playbacks, lull periods, and contextually vital points, within the programming media content.

The presentation engine 208 may comprise suitable logic, circuitry and interfaces that may be configured to present the one or more non-programming media assets (from a second media stream) for a defined duration, concurrently with the programming media content (from the first media stream). The one or more non-programming media assets may be presented concurrently over at least one modified display view of the client device 102. The presentation engine 208 may be configured to ensure a synchronized and parallelized decoding of each frame of the programming media content and the one or more non-programming media assets for concurrent presentation within the modified display view of the client device 102. In this regard, the presentation engine 208 may be configured to perform optimal allocation of at least one worker thread from a thread pool to the first media stream of the programming media content and another worker thread to the second media stream of the one or more non-programming media assets for concurrent execution (or presentation) within the modified display view of the client device 102.

A request, via the request engine 204, may be transmitted by the presentation engine 208 to the graphics engine 110 to encode the programming media content and the one or more non-programming media assets, in accordance with defined one or more attributes, such as, but not limited to, scale, aspect ratio, and resolution. In other words, the presentation engine 208 may manage allocation of the programming media content and the one or more non-programming media assets within the modified displayed view and generate requests to encode such programming media content and assets as per the allocation within the modified display view. Additionally, the presentation engine 208 may synchronize operations with the graphics engine 110 to dynamically present the decoded frames at the modified display view of the client device 102.

The dynamic manifest generator 208A at the client-side may provide functionalities of dynamic manifest manipulation and generation for customized presentation of programming media content at the client device 102. The programming media content schedule that is manipulated by the dynamic manifest generator 208A at the client device 102 may enable viewing at least one of, or a combination thereof, but not limited to, VOD media content, linear media content, live media content, VOD to VOD programming media content, VOD to live programming media content, live to live programming media content, and live to VOD programming media content. Such diverse types of programming media content schedule may be manipulated based on implementation of functions on dynamically modifiable manifest information generated at the dynamic manifest generator 208A.

The verification engine 210 may comprise suitable logic, circuitry, and interfaces that may be configured to verify an enablement of the one or more modifications in the display view of the client device 102 and the corresponding presentation of the one or more non-programming media assets within the modified display view or an unmodified display view at the client device 102. Such verification may correspond to an evaluation of at least one deviation of the modified display view of the client device 102, the presentation of the programming media content, or the one or more non-programming media assets within the modified display view of the client device, from a specified modification. The verification engine 210 may implement at least a defined heuristic, a machine learning, a content recognition, or secured public/private key based authentication methods or beacons to verify the concurrent presentation as well as the one or more modification within the display view. Such methods may be used to estimate the one or more deviation of the modified display view from the specified modification of the display view, presentation of the programming media content, and the one or more non-programming media assets within the modified display view or an unmodified display view.

The user manager 212 may comprise suitable logic, circuitry, and interfaces that may be configured to manage processes and/or requests that may be associated with the at least one preference, activities (or footprints), interaction, or profile of the user 116. Such preferences, activities, interaction, or profile may be stored and managed as user-related data in a user database. The user-related data may be stored as a structured and relational data, or an unstructured and non-relational data in the user database. Every time the user 116 requests, via the client device 102, to access the preferred programming media content, the request may be stored at the user manager 212. The user manager 212 may be configured to authenticate the user 116 upon receiving such request, via the network interface 202A. Additionally, the user manager 212 may be configured to facilitate transactions or payments, in conjunction with a payment engine (not shown), for at least one product or service offerings, promoted via the one or more non-programming media assets. The user database may be configured to store and manage the user-related data in real-time. The user-related data may comprise at least a set of user-authentication data, subscription data, one or more user-preferences, and associated interactions with the presented one or more non-programming media assets at the client device 102. A footprint of the user 116 defines the activities of the user 116 that may be stored in the user database in real-time.

The notification engine 214 may comprise suitable logic, circuitry, and interfaces that may be configured to generate, transmit, and receive responses over the one or more notifications, personalized for the one or more preferences of the user 116. Such one or more notifications may be generated as per specification of the associated one or more delivery platforms. For example, a notification may be generated as per a specification of an e-mail delivery platform, another notification may be generated for a popup notification for a webpage, and yet another notification may be generated for a push-notification that redirects to a user-interface of an application engine at the client device 102 or the one or more delivery devices 112. The notification engine 214 may generate the one or more notifications, based on a defined set of rules for the one or more event opportunity points within the programming media content. The defined set of rules for the generation of the at least one notification may comprise a user-defined constraint, a client-device constraint, a defined goal of impressions, reach or views, or a defined time of generation of the at least one notification. As an example, a user (Y) may engage with a beverage ad by participating in a poll, which may be displayed for "10 seconds" at the modified display view of the client device 102. The notification engine 214 may receive such engagement metadata, and may further generate at least one notification to provide a poll summary and a bundled discount coupon for a next purchase of the beverage promoted via the beverage ad.

The CR engine 216 may comprise suitable logic, circuitry, and interfaces that may be configured to perform content recognition of the modified display view of the client device 102. The CR engine 216 may be further configured to identify whether the programming media content and the one or more non-programming media assets may have been loaded and adaptively displayed within the modified display view of the client device 102. The CR engine 216 may receive control signals, as instructions, from the verification engine 210 or the request engine 204 to perform such content recognition. The CR engine 216 may be operationally characterized as a statistical signal processing engine that may process an audio stream or a video stream of the modified display view or the presented programming media content and the one or more non-programming media assets at the client device 102. The CR engine 216 may be configured to optimally identify at least one region-of-interest within the modified media view that may correspond to the presented one or more non-programming media assets. The CR engine 216 may implement a technique to identify the schedule and the one or more attributes of each of the one or more non-programming media assets. Examples of the technique may include, but are not limited to, acoustic fingerprinting, digital watermarking, and digital video fingerprinting. Additionally, supervised or unsupervised machine learning, deep learning, neural network, or artificially intelligence associated techniques may be implemented to facilitate precise determination of the one or more attributes of the one or more non-programming media assets in the media stream.

In operation, a request with the at least one user preference for the programming media content may be transmitted by the user 116, via the request engine 204 of the client device 102 to the network interface 202A of the media presentation and distribution system 108. The request to stream the programming media content at the client device 102 may be further associated with an authentication request for the user 116. The authentication of the user 116 with the media presentation and distribution system 108 may be managed by the user manager 212 of the client device 102. At least one authentication data of the user 116, which may comprise private keys or encrypted passwords, may be transmitted to the media presentation and distribution system 108 along with the request to stream the programming media content. A validation of the request from the request engine 204 may be performed by the media presentation and distribution system 108. Such validation may correspond to at least a new registration of the user 116 associated with the client device 102, a renewal of service subscription, a verification of payment, an authentication of the at least one authentication data of the user 116 associated with the client device 102, and the like.

As the user 116 is validated by the media presentation and distribution system 108, a display circuitry of the client device 102 may be populated with a user interface of an application engine, which may be configured to render at least one display view at the display circuitry of the client device 102. The application engine at the client device 102 may render a display view in conjunction with the graphics engine 110 of the client device 102. The display view may be an on-screen view of the display circuitry, which may comprise one or more components of at least a media player and a navigational menu, as rendered by the application engine, in conjunction with the graphics engine 110 of the client device 102. Such one or more components may be characterized by one or more graphical objects and one or more non-graphical objects. Initially, the application engine may be tasked with the enablement of the one or more non-graphical objects of the display view. The one or more non-graphical objects may correspond to a markup of a player, timer, logo, bugs, thumbnails, and the like. The markup may specify a position, a size and a scale, and an aspect ratio of the one or more non-graphical objects within the displayed view of the client device 102. Thereafter, the graphics engine 110 may be configured to render the one or more graphical objects over the top of the one or more non-graphical objects, such as player branding, animation, responsive objects, and buttons. Such rendering of the one or more graphical objects may be personalized for the client device 102, as per the at least one user-preference. Thereafter, the application engine, in conjunction with the graphics engine 110, may be configured to render a customized display view at the display circuitry associated with the client device 102.

In response to the request received from the client device 102, the media presentation and distribution system 108 may be configured to transmit a first media stream of the preference-based programming media content to the client device 102, via the communication network 114. The client device 102 may receive the first media stream of the preferred programming media content, via the network interface 202A, which may comprise dedicated network ports for streaming such first media stream. The client device 102 may comprise at least one memory device, which may comprise at least one memory block, reserved for caching of the communication data received, via the communication network 114. In one such case, the first media stream may be cached in the at least one memory block of the at least one memory device of the client device 102. The media presentation and distribution system 108 may also transmit a client manifest, along with the first media stream, to the client device 102. In some embodiments, the client device 102 may further include a catalogue store (not shown). The catalogue store may include a VOD catalogue of available programming media content and a live catalogue society of cable telecommunication engineers (SCTE)-224 schedule) of available programming media content, which may be pre-cached onto the client device before or after user request.

The cached first media stream may be encrypted with a defined encryption technique to prevent unauthorized access of the programming media content within the first media stream. The programming media content within the first media stream may be stored as one or more encrypted blocks of the programming media content in the at least one memory block of the at least one memory device of the client device 102. Video content of the programming media content may be stored as one or more encrypted video blocks and audio content of the programming media content may be stored as one or more encrypted audio blocks within the at least one memory block. Each encrypted audio or video block may comprise an integer number of blocks, for example 16-byte blocks, which may be encrypted using the defined encryption technique, such as AES-128 cipher block chaining (CBC) mode with no padding.

As the first media stream is cached, the presentation engine 208 decrypts the encrypted one or more audio blocks and the encrypted one or more video blocks of the programming media content within the cached first media stream, stored at the at least one memory block in the client device 102. The decryption of the programming media content within the cached first media stream may be performed, in conjunction with the application engine or the user manager 212 within the client device 102. The presentation engine 208 may be further configured to decode the decrypted blocks (or frames) of the audio content or the video content within the programming media content based on a defined codec engine (not shown), which may be present within the presentation engine 208 or may be accessible via at least one application programming interface (API) of a third party network. Examples of the defined codec engine for the audio content or the video content may include, but are not limited, H.265/MPEG-H HEVC, H.264/MPEG-4 AVC, H.263/MPEG-4 Part 2, H.262/MPEG-2, Microsoft codecs, Google (On2), and specifically, x264, HEVC, Xvid, FFmpeg, Divx, Windows Media Encoder, VP version[3-9], FFavs, and x265. Such defined codec engine may be hardware-accelerated or may be programmatically accelerated by the graphics engine 110 of the client device 102. Each of the one or more decoded blocks of the programming media content may be presented within an allocated region of the rendered display view, associated with the display circuitry of the client device 102. The presentation engine 208 may be further configured to manage resource allocation for the decoding and presentation of the programming media content, thread pool management for managing concurrent thread allocation for different operations, and regulation of the playback of the programming media content at the display view of the client device 102, in accordance with at least one playback specification in the client manifest. Such playback specification may include, but may not be limited to, a frame rate, a saturation, a brightness, a contrast, an aspect ratio, and a resolution of the programming media content.

The programming media content within the cached first media stream may be played at the client device for a defined playback duration, as per the playlist of the one or more programs within the programming media content. The playlist of the one or more programs may be dynamically modified by the dynamic manifest generator 208A. For example, the playlist may be modified to present the one or more programs as at least one of, or a combination of, but not limited to, a linear playlist of programs, a live playlist of programs, a non-linear (or VOD) playlist of programs, a live to live, a VOD to VOD, a linear to VOD, a non-linear to linear playlist of programs. As the presentation engine 208 executes the playback of the programming media content at the display view, one or more tags inserted within the programming media content may be detected at the one or more event opportunity points within the programming media content. Each tag within the first media stream may correspond to a corresponding event opportunity point within the programming media content. Each of such one or more event opportunity points may correspond to a specified event, which may correspond to at least start credits, end credits, lull points, time-based marked regions, location-based marked regions, and context-based marked regions within the programming media content. Each tag and associated metadata may specify at least a pointer for a defined playback duration of a corresponding event opportunity point, one or more modifications in a display view for the defined playback duration, a descriptor or pointer to a corresponding non-programming media asset to be presented within the playback duration of the corresponding event opportunity point and the like.

Accordingly, as the presentation engine 208 may detect each tag within the programming media content, the corresponding event opportunity point of a defined duration may be identified for the presentation of the programming media content with the one or more non-programming media assets, for example, a video advertisement, a promotional video, a recap, or a trailer. However, such concurrent playback of the programming media content and the one or more non-programming media assets may require one or more modifications in the display view of the client device 102. Therefore, the presentation engine 208 may be further configured to transmit a request, via the request engine 204, to the modification engine 206 to enable such one or more modifications in the display view.

At each detected tag within the programming media content, the modification engine 206 may be configured to modify the display view, for the defined duration, with the one or more modifications. Prior to modifications, the modification engine 206 may be configured to seek permissions/rights from the media presentation and distribution system 108 to apply the one or more modifications within the display view of the client device 102. Therefore, the modification engine 206 may provide at least one occurrence of the one or more event opportunity points within the programming media content to the media presentation and distribution system 108, via the communication network 114. Additionally, the modification engine 206 may generate and transmit a request to the media presentation and distribution system 108, in conjunction with the request engine 204, to select the one or more event opportunities within the programming media content, as streamed at the client device 102.

Accordingly, the media presentation and distribution system 108 may receive, from the client device 102, the at least one occurrence of the one or more event opportunity points within the programming media content. A response on the received one or more event opportunity points may be provided by the media presentation and distribution system 108 to the client device 102. The response may be provided as a decision for application of the one or more modifications and associated concurrent presentation of the one or more non-programming media assets with the programming media content. The response may be provided based on a defined criteria, which may include, but are not limited to, at least a retrieved set of user-preferences, at least one defined goal, a measured attention of the user 116 associated with the client device 102, time constraints, inventory constraints, and user-defined constraints.

For example, a tag (TAG1) that may be present at a playback time (T1), for example, "00:10:13", and may specify a lull point in a program (P1), played at the display view of the client device 102. The presentation engine 208 may detect such tag (TAG1) at the playback time (T1), and may request the modification engine 206 to get permissions/rights for application of the one or more modifications and concurrent presentation of the one or more non-programming media assets specified within the tag (TAG1) for the corresponding lull point in the program (P1). The media presentation and distribution system 108 may select the lull point (which is the event opportunity point) within the programming media content for modification of the display view. The selection may be based on a sales target or an impression target for a non-programming media asset, such as a cola advertisement or a user preference, such as a preference for non-alcoholic beverages of the user 116.

As the modification engine 206 receives the selection and associated permissions/rights from the media presentation and distribution system 108, the modification engine 206 performs one or more operations for the one or more modifications of the display view, in conjunction with the graphics engine 110 of the client device 102. Examples of the one or more operations may include, but are not limited to, identification of each specified modification in each graphical object or each non-graphical object loaded for the display view, a defined number of partitions of the display view, associated defined region, a size, a scale, an aspect ratio and a life-time of each of such defined number of partitions of the display view, allocation of the programming media content and the one or more non-programming media assets within the modified display view, and regulation of a behavior of the modified display view within the defined duration of the corresponding selected event opportunity point. The regulation of behavior may correspond to granular transitions or modifications in the size, scale, number, responsiveness, or a defined visual attribute of each graphical object or non-graphical object of the display view for the defined duration of the selected event opportunity point. The routines, logic, resources, or programmable instructions for the one or more modifications may be obtained from the metadata of the corresponding tag in the client manifest. In accordance with an embodiment, the media presentation and distribution system 108 may provide the metadata, comprising the routines, logic, resources, or programmable instructions for the selection of the one or more event opportunity points within the programming media content and the response for the received request from the modification engine 206. Further, the modification engine 206, in conjunction with the graphics engine 110, may render, for the defined duration, the modified display view at the display circuitry associated with the client device 102. The one or more modifications in the display view of the client device 102 may include, but is not limited to, a squeeze-back of the programming media content to the defined region within the display view, an overlay over the defined region within the display view, and a partitioned view of the display view. Such modifications may be personalized for the user 116 based on a retrieved set of user-preferences for the user 116.

As the modification engine 206 performs the one or more modifications in the display view, the presentation engine 208 concurrently manages the presentation of the one or more non-programming media assets within the modified display view of the client device 102. The one or more non-programming media assets for presentation may be specified within the metadata of each tag, present within the client manifest and may be specified by the media presentation and distribution system 108 at the time of the reception of the request from the client device 102. The presentation engine 208 may be configured to perform one or more operations to maintain the concurrency of the presentation of the programming media content with the one or more non-programming media assets within the modified display view of the display circuitry. The one or more operations may include, but are not limited to, a request to retrieve the one or more non-programming media assets from the media presentation and distribution system 108, an encoding of the programming media content and the retrieved one or more non-programming media assets to a defined scale, size, resolution, aspect ratio of the allocated region or partition within the modified display view, a placement of the programming media content, and the encoded one or more non-programming media assets at the allocated partition or the defined region within the modified display view at the display circuitry, associated with the client device 102.

Initially, the presentation engine 208 may transmit a request, via the request engine 204, to the media presentation and distribution engine to provide the one or more non-programming media assets for playback at the determined one or more event opportunity points within the modified view of the client device 102. The media presentation and distribution system 108 may be configured to transmit a second media stream of the requested one or more non-programming media assets in response to the request received from the presentation engine 208 of the client device 102. The transmitted second media stream of the requested one or more non-programming media assets may be received at the client device 102, via the network interface 202A. The received second media stream may be encrypted and may be stored at the at least one memory block of the at least one memory device in the client device 102. The storage, decryption and decoding of the second media stream may be similar to what has been described above for the first media stream. The first media stream and the second media stream may be received at the client device 102 as concurrent media streams, and each of the first media stream and the second media stream may be managed concurrently via at least one independent thread at the client device 102.

The presentation engine 208, in conjunction with the graphics engine 110, may be further configured to encode the one or more non-programming media assets of the second media stream to a scale, a size, a resolution, and an aspect ratio of the allocated partition or the defined region within the modified display view of the client device 102. As an example, a non-programming media asset (A) may be an MPEG-4 video, with an AAC audio, such that the size of each frame of the non-programming media asset (A) may be "1920 px" ("px" refers to pixels) by height and "1280 px" by width, with an aspect ratio of "1920:1280", that is, "16:9". The presentation engine 208 may be configured to encode (or scale) each frame of the non-programming media asset (A) to "1280 px by 720 px" without affecting the aspect ratio (of "16:9") of the non-programming media asset (A).

The presentation engine 208 may be further configured to present the one or more non-programming media assets, from the second media stream for the defined duration, concurrently with the programming media content from the first media stream over the at least one modified display view of the client device 102. Such concurrent presentation of the programming media content from the first media stream along with the one or more non-programming media assets from the second media stream may increase a likelihood of an engagement of the user 116 associated with the client device 102. The likelihood of engagement may be improved based on a targeted selection of the one or more event opportunity points to improve an attention span of the user 116. The presentation of the encoded one or more non-programming media assets and the encoded programming media content, at the modified display view of the client device 102, may be synchronized with the one or more modifications in the display view of the client device 102, such that the transition from the display view to the modified display view and the concurrent presentation of the encoded programming media content and the encoded one or more non-programming media assets is seamless for the user 116.

In general, the personalized and concurrent delivery of the programming media content and the one or more non-programming media assets, and the associated one or more modifications within the display view may require a concrete verification at either the client-side (that is the client device 102) or at the server-side (that is the media presentation and distribution system 108). Therefore, the verification engine 210, in conjunction with the media presentation and distribution system 108, may be configured to verify an enablement of the one or more modifications in the display view of the client device 102 and the presentation of the at least one media item within the modified display view or an unmodified display view at the client device 102. Such client-side verification may be based on one or more techniques, which may be used to identify at least one deviation in the modified display view and the presented programming media content and the one or more non-programming media assets. Example of the one or more deviations may include, but are not limited to, a partial overlay, a color imbalance, an error with transition or overlay, an abrupt disappearance of the one or more non-programming media assets or the programming media content from the modified display view, and a non-responsive playback of the one or more non-programming media assets. In response to the detection of the one or more deviations, the verification engine 210 may be configured to trigger, in conjunction with the media presentation and distribution system 108, at least one circuitry or programmable routine to adjust or correct the detected one or more deviations in the presentation of the programming media content and the one or more non-programming media assets within the modified display view as well as the one or more modifications in the display view of the client device 102.

In accordance with an embodiment, the notification engine 214 in the client device 102 may be configured to generate and serve one or more notifications, via one or more delivery platforms or one or more delivery devices 112 associated with the user 116. The one or more notifications may be generated, based on a defined set of rules, for the one or more event opportunity points within the programming media content. Such one or more notifications may be intended to at least inform the user 116 about a presented non-programming media asset, an engagement of the user 116 with the presented non-programming media asset, a promotional offer on the promoted offering in the presented non-programming media asset, and the like. The defined set of rules for generation of the one or more notifications may comprise a user-defined constraint, a client-device constraint, a defined goal of impressions, reach or views, a defined time of generation of the at least one notification, and a specified type of the one or more notifications, for example, push, pop-up, fixed, and interactive notifications. Additionally, each of the one or more notifications may provide at least one selectable option for the user 116 to provide a request for at least one service. Such service may correspond to an engagement of the user 116 with the offering presented in the corresponding non-programming media asset. Therefore, the notification engine 214 may be further configured to receive a request based on a response from the user 116 over the served one or more notifications. Example of the one or more services may include, but are not limited to, subscriptions, payments, registrations, upgrades, updates, purchases, transactions, sign up or sign in, for at least one product, service or event offering, promoted by the presented one or more non-programming media assets with the programming media content. Additionally, the presentation engine 208 may be configured to instruct the presentation of the one or more non-programming media assets or the programming media content for the received request on the served one or more notifications. In certain cases, the notification engine 214 may generate the one or more notifications in response to the presentation of the one or more non-programming media assets at the selected one or more event opportunity points within the programming media content.

It may be noted that the present disclosure has been described in light of engagement of a single user with the client device 102. However, the present disclosure may be applicable for a plurality of users, each of which may engage with one or more client devices, without a deviation from the scope of the disclosure. Such engagement of the plurality of users may be concurrent, sequential or at random. The media presentation and distribution system 108 may optimally balance the requirements and perform management of a corresponding plurality of requests from the plurality of users in real-time.

Figure 2B:
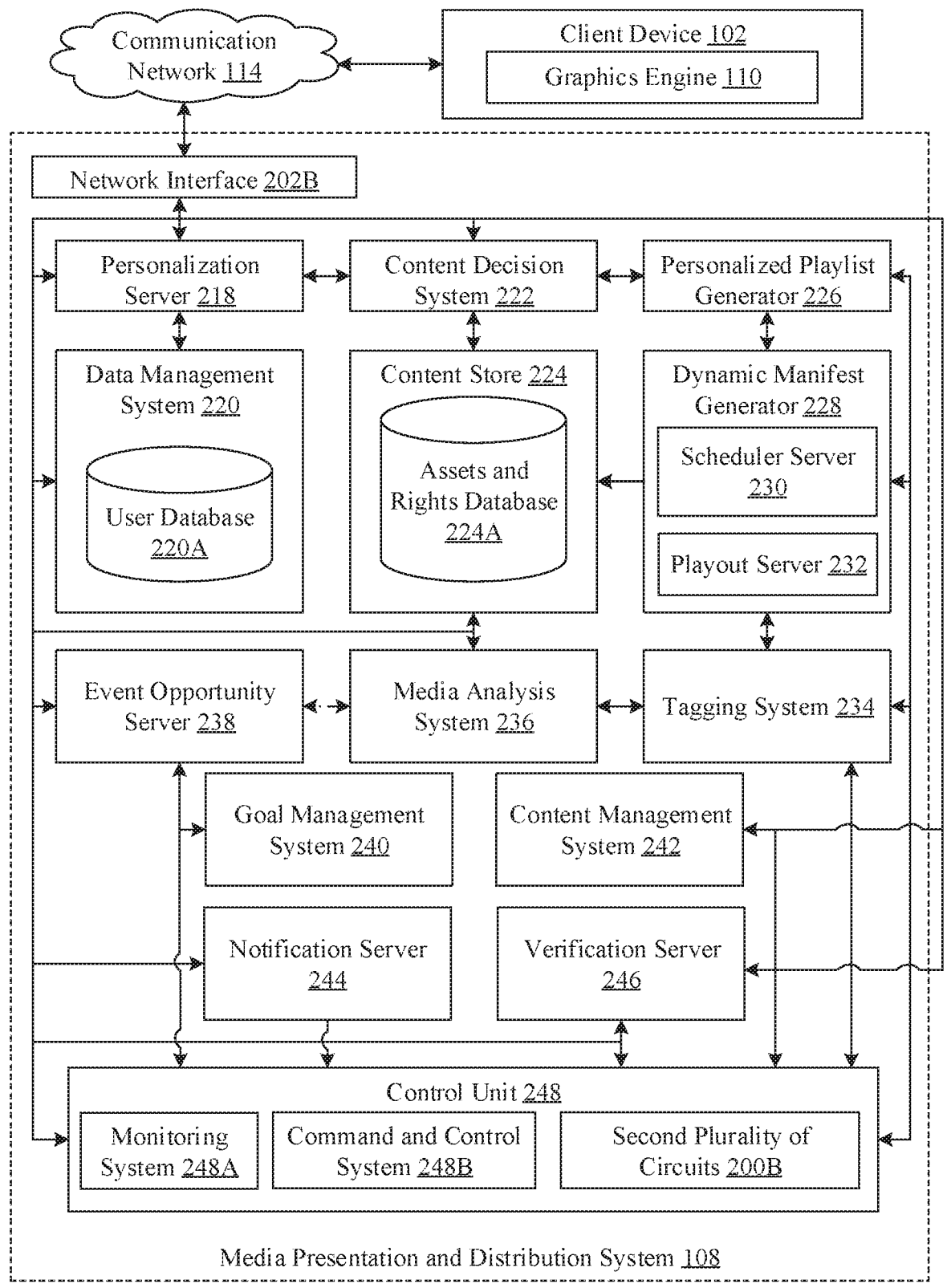
FIG. 2B is a block diagram that illustrates an exemplary media presentation and distribution system at a server-side to enable client-side concurrent presentation of non-programming media assets and programming media content, in accordance with an embodiment of the present disclosure.

FIG. 2B is a block diagram that illustrates an exemplary media presentation and distribution system at a server-side to enable client-side concurrent presentation of non-programming media assets and programming media content, in accordance with an embodiment of the present disclosure. Referring to FIG. 2B, there is shown the media presentation and distribution system 108 that comprises a network interface 202B, a personalization server (PS) 218, a data management system (DMS) 220, a user database 220A, a content decision system (CDS) 222, a content store (CS) 224, an assets and rights database 224A, a personalized playlist generator (PPG) 226, a dynamic manifest generator 228, a scheduler server (SS) 230, a playout server (PLS) 232, a tagging system (TS) 234, a media analysis server (MAS) 236, an event opportunity server (EOS) 238, a goal management system (GMS) 240, a content management system (CMS) 242, a notification server (NS) 244, a verification server (VS) 246, and a control unit (CU) 248, communicatively coupled with each other in the media presentation and distribution system 108. The operation of aforementioned components may be executed by a second plurality of circuits 200B that may be present in the control unit 248. Although not shown in FIG. 2B, the second plurality of circuits 200A may include one or more processors that may operate on instructions that may be stored in a memory present on the media presentation and distribution system 108.

The network interface 202B may comprise suitable logic, circuitry, and interfaces that may be configured to operate as a communication bridge between various component of the client device 102, the CDN 104, the media assets server 106, and the one or more delivery devices 112 associated with the user 116 and various computing components of the media presentation and distribution system 108. The network interface 202B may be implemented by use of known technologies to support wired or wireless communication of the various computing components of the media presentation and distribution system 108 with peripheral components, such as the client device 102, the CDN 104, the media assets server 106, and the one or more delivery devices 112 associated with the user 116. Additionally, the network interface 202B may operate as a switch or a router of communication signals to dedicated components of the media presentation and distribution system 108. Components of the network interface 202B may include, but are not limited to, an antenna, an RF transceiver, one or more amplifiers, a tuner, one or more oscillators, a digital signal processor, a CODEC chipset, and/or a local buffer.

The PS 218 may comprise suitable logic, circuitry and interfaces that may be configured to operate as a communication interface between the (client-side) client device 102 and the (server-side) DMS 220. The PS 218 may be specifically configured to communicate, via the network interface 202B, with the client device 102 associated with the user 116, using communication signals. The one or more requests, from the client device 102, may be received at the network interface 202B and the network interface 202B may be configured to route the received one or more requests to the PS 218. The PS 218 may be configured to parse one or more request parameters in each received request from the client device 102, and communicate the parsed one or more request parameters with the DMS 220 to form semantic relationship models among at least one of preferences, profile, likes, dislikes, location or demographic factors associated with the user 116 associated with the client device 102. The semantic relationship models may be statistical models of the one or more user-preferences of the user 116 associated with the client device 102 and may provide a better understanding of the user-behavior, preferences, attention, intent, and interest for requested one or more preferences of the programming media content. The PS 218 may be further associated with the CDS 222 and may communicate the parsed one or more request parameters to the CDS 222.

The DMS 220 may comprise suitable logic, circuitry and interfaces that may be configured to store, collate, assimilate data, associate relationships within stored data of the user 116. The DMS 220 may specifically form a data cloud for the one or more user-preferences, likes, dislikes for the programming media content and the one or more non-programming media assets, demography, financial information, location, and the like. The DMS 220 may be further configured to generate deep or shallow semantic relationship models of the stored and assimilated data for the user. For example, for a user (B), the DMS 220 may identify that the user (B) may have a preference for "sports", a liking for "NFL", a liking for the team "Atlanta Falcons", and for a specific player "X" within the team of "Atlanta Falcons". Additionally, the DMS 220 may identify that the user (B) has a disliking for "Detroit Lions", and therefore, the DMS 220 may form a deep semantic relationship model (Ml) that may ascertain that the user (B) may be served with non-programming media assets, such as video advertisements or bugs, which may be associated with the player "X" and "Atlanta Falcons" and not associated with the "Detroit Lions" or associated team member of "Detroit Lions". Accordingly, the DMS 220 further update the deep semantic relationship models of one or more features, for examples, a deep relationship of "100" features of the user (B). The data associated with the user 116 may be shared by the DMS 220 in response to requests from each component of the media presentation and distribution system 108.

The DMS 220 may comprise at least the user database 220A. The user database 220A may comprise suitable logic, circuitry and interfaces that may be configured to store and update records for the one or more preferences, likes, dislikes, demography, location, income or related data of the user 116 associated with the client device 102.

The CDS 222 may comprise suitable logic, circuitry and interfaces that may be configured to identify, from a curated repository of programs in the CS 224, an available one or more programs that may match the one or more request parameters from the client device 102 associated with the user 116. The CDS 222 may further perform ranking of the identified one or more programs for the user 116, sorting of the identified one or more programs for the user 116, and selection of the one or more programs from the sorted and ranked one or more programs. After selection, the CDS 222 may be configured to obtain or negotiate content rights, permissions, or certificates for the selected one or more programs for playout to the client device 102, associated with the user 116. The CDS 222 may be communicatively coupled with the PPG 226, and further configured to transmit the selection for the one or more programs to the PPG 226.

The CS 224 may comprise suitable circuit, interface, may comprise suitable logic, circuitry and interfaces that may be configured to store and manage an inventory of one or more non-programming media assets, such as advertisements, promos, trailers, and recaps, a curated repository of programs, associated rights, certificates or licenses for the one or more non-programming media assets, and the curated repository of programs. The CS 224 may comprise at least the assets and rights database 224A.

The assets and rights database 224A may comprise suitable logic, circuitry and interfaces that may be configured to store the one or more non-programming media assets, and associated metadata and rights. Such associated metadata and rights may be invoked or validated at a playback time of the one or more non-programming media assets.

The PPG 226 may comprise suitable logic, circuitry and interfaces that may be configured to generate a personalized playlist of the selected one or more programs. The personalized playlist may correspond to a recommended sequence of one or more programs for the corresponding one or more request parameters in the received request, at the PS 218, from the client device 102. Such recommended sequence may be a data structure of one or more recommended sequences associated with metadata for each of the one or more recommended sequences. In accordance with an embodiment, the user 116 may be presented with each of the one or more recommended sequences of the one or more programs at the client device 102. Based on a selection of the recommended sequence from the presented one or more recommended sequences, the PPG 226 may be configured to communicate the personalized playlist of the one or more programs to the dynamic manifest generator 228.

The dynamic manifest generator 228 may comprise suitable logic, circuitry, and interfaces that may be configured to assimilate, prepare, encode, and stream a first media stream of the programming media content that includes the one or more programs of the personalized playlist. The assimilation and preparation of the programming media content is performed in conjunction with retrieval of the programming media content from at least the CS 224 and the CDN 104 associated with the media presentation and distribution system 108. The Dynamic manifest generator 228 may comprise the SS 230 and the PLS 232, which may be communicatively coupled with each other.

The SS 230 may comprise suitable logic, circuitry, and interfaces that may be configured to assimilate, schedule, encode and package the one or more programs in the personalized playlist for playout to the client device 102. The SS 230 may be configured to retrieve the one or more programs as per a scheduled playout of the programming media content. The one or more programs may be retrieved by the SS 230 from at least the CDN 104 or the CS 224 within the media presentation and distribution system 108 for assimilation of the retrieved one or more programs to obtain the programming media content. As for the uncompressed one or more programs, the SS 230 may be configured to encode each of the one or more uncompressed programs. The SS 230 may be configured to transmit the packaged programming media content to the PLS 232.

The PLS 232 may comprise suitable logic, circuitry, and interfaces that may be configured to encapsulate and stream the programming media content, received from the SS 230, on the first media stream (which may be a transport media stream, such as an MPEG-2 TS stream). Additionally, the PLS 232 may be configured to encrypt and stream the first media stream to the client device 102, via the network interface 202B. In accordance with an embodiment, the encrypted first media stream may be segmented into one or more segments to facilitate adaptive bitrate streaming over to the client device 102 in light of an availability of network bandwidth for the client device 102, associated with the user 116. The PLS 232 may be further configured to transmit a request to a TS 234 for generation and insertion of the one or more tags at determined one or more event opportunity points within the programming media content in the first media stream. Such tags may be invoked at the client device 102 to facilitate the modification of the display view at the client device 102 and concurrent presentation of the one or more non-programming media assets, such as advertisements, promos, trailers, and recaps, with the programming media content.

The TS 234 may comprise suitable logic, circuitry, and interfaces that may be configured to generate at least one tag, associated metadata, and resources for tagging of the programming media content within the first media stream. The generation of each of the one or more tags may be determined for the one or more event opportunity points within the programming media content. Each tag may specify at least one modification of the display view, a pointer to a duration of the corresponding event opportunity point within the programming media content, and a descriptor of the corresponding one or more non-programming media assets to be loaded at the detection of the corresponding tag at the client device 102. The tagging system may be configured to transmit a request to the MAS 236 to provide the determined one or more event opportunity points within the programming media content and identify information associated with the one or more non-programming media assets for presentation at the determined one or more event opportunity points. Such request may be transmitted to the MAS 236 along with the personalized list of the one or more programs. The TS 234 may be configured to insert the generated one or more tags at the determined at least one event opportunity point within the programming media content based on the received request from the client device 102.

The MAS 236 may comprise suitable logic, circuitry, and interfaces that may be configured to determine the one or more event opportunity points within the programming media content and identify information associated with the one or more non-programming media assets based on a context, a user-preference, or a defined goal for presentation of the one or more non-programming media assets within the determined one or more event opportunity points. In accordance with an embodiment, the MAS 236 may determine the one or more event opportunity points based on content recognition of the programming media content. In accordance with an embodiment, the MAS 236 may be configured to determine the one or more event opportunity points based on semantic or context mining of context of the programming media content. Further, the MAS 236 may be configured to identify the information associated with the one or more non-programming media assets for playback during the playback time of the determined one or more event opportunity points within the programming media content. In accordance with an embodiment, the information associated with one or more non-programming media assets may be identified based on a degree of a correlation of context of the one or more non-programming media assets with a corresponding context of the one or more event opportunity points within the programming media content. The one or more non-programming media assets may be selected for the concurrent presentation with the programming media content based on significant degree of correlation of the determined context of the one or more non-programming media assets with the programming media content. In accordance with an embodiment, the information associated one or more non-programming media assets may be identified based on a retrieval of a set of user-preferences for the user 116 associated the client device 102, and selection of the one or more non-programming media assets for concurrent presentation with the programming media content based on the retrieved set of user-preferences. Such retrieval of the set of user-preferences and the associated selection of the one or more non-programming media assets may be performed by the MAS 236. The determined one or more event opportunity points, associated metadata, and the identified one or more non-programming media assets for presentation may be transmitted to the TS 234.

The EOS 238 may comprise suitable logic, circuitry, and interfaces that may be configured to operate as an event signaling and management (ESAM) server, which may manage execution, performance and personalization of the programming media content, the one or more non-programming media assets for the user 116, and the modifications in the display view of the client device 102. In other words, the EOS 238 may be an event decisioning system that may be configured to respond to each request from the client device 102. Example of such request may include, but is not limited to, a selection of the one or more event opportunity points within one or more occurrences of the one or more event opportunity points within the programming media content, a selection of the one or more modifications to be performed for the display view, a selection of the one or more non-programming media assets for presentation at the playback time, and the like. Additionally, the EOS 238 may be communicatively coupled with the GMS 240, the NS 244, and the VS 246. Therefore, the EOS 238 may be configured to improve or factor decisions on the received requests from the client device 102, based on communication from the GMS 240, the NS 244, and the VS 246.

The GMS 240 may comprise suitable logic, circuitry, and interfaces that may be configured to manage at least one goal parameter (hereinafter, "one or more goal parameters") for each of the one or more non-programming media assets. The management of the at least one goal parameter may be based on granular measures of each of the one or more goal parameters to achieve the one or more goals in a corresponding flight. Examples of the one or more goal parameters may include, but are not limited to, impressions, views, clicks, sales, reach, and leads. The one or more goal parameters may be moderated by the GMS 240, in conjunction with a campaign manager. For example, a non-programming media asset (C) may be associated with a goal parameter of achieving a defined count of impressions or views, such as "1 million". The GMS 240 may be further configured to update each corresponding goal parameter during the playback of the one or more non-programming media assets at the modified display view of the client device 102.

The CMS 242 may comprise suitable logic, circuitry, and interfaces that may be configured to manage retrieval and delivery of a second media stream of the one or more non-programming media assets to the client device 102, via the communication network 114. The CMS 242 may receive a request from the client device 102 to provide the second media stream of the one or more non-programming media assets for presentation at the modified display view of the client device 102. Based on the received request, the CMS 242 may prepare the second media stream of the requested one or more non-programming media assets, encrypts, and transmits the second media stream to the client device 102.

The NS 244 may comprise suitable logic, circuitry, and interfaces that may be configured to generate and transmit one or more notifications. The NS 244 may further receive responses over the one or more notifications. Such one or more notifications may be generated as per specification of the associated one or more delivery platforms. For example, a notification may be generated as per a specification of an e-mail delivery platform, another notification may be generated for a popup notification for a webpage, and yet another notification for a push-notification that redirects to a user-interface of an application engine at the client device 102 or the one or more delivery devices 112. The NS 244 may generate the one or more notifications based on a defined set of rules for the one or more event opportunity points within the programming media content. The defined set of rules may include, but are not limited to, a user-defined constraint, a client-device constraint, a defined goal of impressions, reach or views, and a defined time of generation of the at least one notification. As an example, a user may engage with "coffee ad" by participating in a poll, which may be displayed for "10 seconds" at the modified display view of the client device 102. The NS 244 may receive such engagement metadata, and may further generate at least one notification to provide a poll summary and a bundled discount coupon for a next purchase of the coffee promoted via the "coffee ad".

The VS 246 may comprise suitable logic, circuitry, and interfaces that may be configured to verify an enablement of the one or more modifications at the display view of the client device 102 and the corresponding presentation of the one or more non-programming media assets within the modified display view or an unmodified display view at the client device 102. Such verification may correspond to an evaluation of at least one deviation of the modified display view of the client device 102, or the presentation of the programming media content and the one or more non-programming media assets within the modified display view of the client device 102. The verification engine 210 may implement at least a defined heuristic, a machine learning, a content recognition, or secured public/private key based authentication methods or beacons to verify the concurrent presentation as well as the one or more modification with the display view. Such methods may be used further to estimate the one or more deviation of the modified display view from the specified modification of the display view and presentation of the programming media content and the one or more non-programming media assets within the modified display view or an unmodified display view.

The CU 248 may comprise suitable logic, circuitry, and interfaces that may be configured to monitor, instruct and calibrate operations of each component of the media presentation and distribution system 108, via at least one control signal. Each component may be monitored, instructed, and calibrated for synchronized and lag-free operations for the requests received from the client device 102. The CU 248 may comprise a monitoring system (MS) 248A, a command and control system (CCS) 248B, and an operation and maintenance system (OMS). The MS 248A may comprise suitable logic, circuitry, and interfaces that may be configured to monitor execution and performance of the operations performed by each component of the media presentation and distribution system 108. Although not illustrated in FIG. 2B, the MS 248A may include a dedicated CCS and an OMS, without a deviation from scope of the disclosure.

The CCS 248B may comprise suitable logic, circuitry, and interfaces that may be configured to generate and issue commands to instruct a flow of operations of each component of the media presentation and distribution system 108, via the issued commands. The OMS may comprise suitable logic, circuitry, and interfaces that may be configured to perform various operational and maintenance activities of each component of the media presentation and distribution system 108.

In operation, the network interface 202B of the media presentation and distribution system 108 may be configured to receive a request from the user 116 associated the client device 102 media presentation and distribution system 108, via the communication network 114. The received request may correspond to a request to stream the programming media content at the client device 102. Such programming media content may be personalized for the user 116 based on one of one or more request parameters. The one or more request parameters may include, but are not limited to, a request time, the one or more preferences for the programming media content, device data, network configuration, network IP, device IP and client device type.

The network interface 202B may route the received request to the PS 218. The PS 218 may be configured to extract the one or more request parameters from the received request and parse the one or more request parameters in each received request from the client device 102. The PS 218 may operate as a front-end of the DMS 220 and communicate the parsed one or more request parameters to the DMS 220 and the CDS 222. In some embodiments, the PS 218 may further include a catalogue store (not shown). The catalogue store may include a VOD catalogue of available programming media content and a live catalogue society of cable telecommunication engineers (SCTE)-224 schedule) of available programming media content.

The DMS 220 may be configured to store and collate the parsed one or more request parameters with a set of user-preferences of the user 116. The parsed one or more request parameters may define granular interests of the user 116 and therefore, the DMS 220 may generate semantic relationship models (shallow or deep) based on associations built among the granular interests for the corresponding one or more request parameters. Thereafter, the DMS 220 may store and form a data cloud of the one or more preferences, likes, dislikes for the programming media content and the one or more non-programming media assets, demography, financial information, location, and the like. Such data cloud for the user 116 may be generated from sources, such as social media footprints, web footprints, searches, past engagements with the programming media content, and specific non-programming media assets.

For example, for a user "Alex", the DMS 220 may receive a parsed request parameter that comprises a preference for a "lifestyle" genre, associated with searched keywords "Travel" and "Food". The DMS 220 may retrieve the set of user-preferences associated with the searched keywords or the request parameter. Based on the retrieved set of user preferences, the DMS 220 may infer that "Alex" has a liking for "Paris", "Atlanta", and "Street Food" and a preference for "sea-based locations". The DMS 220 may identify that "Alex" dislikes "Meat Products" and "Cheese Products" from social media footprints. Therefore, the DMS 220 may form a relationship model that may be used to ascertain that "Alex" may be a "Vegan" and may be served with non-programming media assets, such as video advertisements or bugs, or the programming media content, which may promote or showcase vegan food around the preferred travel location.

Each preference, like, or dislike may be factored as one or more features for a certain semantic relationship model and each relationship model may be generated based on factoring the one or more features, which may be "1000" or even "10000" for a given scenario. Accordingly, the DMS 220 may further update records for the parsed one or more request parameters, and the generated the relationship models within the user database. Data associated with the user 116 may be shared by the DMS 220 with the PS 218 in response to request received from the PS 218.

The CDS 222 may be configured to identify available one or more programs that may bear correlation with the parsed one or more request parameters or the generated relationship models. For such identification, in one implementation, the CDS 222 may search for available one or more programs within a curated repository of programs in the CS 224. In other implementation, the CDS 222 may utilize the catalogue store to search for available one or more programs within a curated repository of programs in the CS 224. Also, the CDS 222 may search for available one or more programs from media servers of the CDN 104. The CDS 222 may identify the available one or more programs for the user 116, based on the one or more user preferences, one or more targeting parameters, such as location, playback history, demography, age and gender, and applicable content rights. In accordance with an embodiment, the identified one or more programs may be ranked and sorted for the user 116. After identification of the available one or more programs, the CDS 222 may be configured to obtain or negotiate content rights, permissions, or certificates for the identified one or more programs for playout to the client device 102. The content rights, permissions, or certificates for the identified one or more programs may be obtained from the assets and rights database 224A of the CS 224. In other words, the CDS 222 may identify the preferred programming media content, which may optimally satisfy the requirement of the user 116. The CDS 222 may transmit metadata for the identified one or more programs to the PPG 226.

For example, a user "Smith" may have a preference for "News" from "Georgia", a liking for "Sports News" and a dislike for "Crime News". The CDS 222 may search for available programs within the CS 224 or the CDN 104 that be factored based on preferences, likes or dislikes of "Smith". Accordingly, the CDS 222 identifies "X1_News", "X2_News" and "X3_News" for "Smith". Such programs may be sorted and arranged in an order of relevance for "Smith".

The PPG 226 may be configured to receive the metadata for the identified one or more programs from the CDS 222 and generate a personalized playlist of the identified one or more programs. The personalized playlist may correspond to a recommended sequence of one or more programs for the corresponding one or more request parameters in the received request at the PS 218. Such recommended sequence may be a data structure of one or more recommended sequences associated with metadata for each of the one or more recommended sequences. In an exemplary scenario, one or more recommended sequences of programs of different lengths may be sorted and generated by the CDS 222. The user 116 may be presented with each of the one or more recommended sequences of the one or more programs at the client device 102. Based on a selection of a recommended sequence from the presented one or more recommended sequences, the PPG 226 may communicate the personalized playlist of the one or more programs to the dynamic manifest generator 228. The SS 230 of the dynamic manifest generator 228 may encode the uncompressed one or more programs in the personalized playlist.

The SS 230 in the dynamic manifest generator 228 may be further configured to assimilate, schedule, and package the encoded one or more programs in the personalized list, in conjunction with the CS 224 or the CDN 104. The encoding, assimilation, scheduling, and packaging of the one or more programs as the programming media content is performed for the retrieved programming media content from at least the CS 224 and the CDN 104. For assimilation and scheduling, the SS 230 may retrieve the one or more programs in the personalized playlist, as scheduled for playout at the client device 102. The programming media content that is prepared by the dynamic manifest generator 228 may include at least one of, or a combination thereof, but not limited to, VOD media content, linear media content, live media content, VOD to VOD programming media content, VOD to live programming media content, live to live programming media content, and live to VOD programming media content. Such diverse types of programming media content may be generated based on implementation of functions on dynamically modifiable manifest information generated at the dynamic manifest generator 228.

The packaged programming media content of the one or more programs may be transmitted to the PLS 232. A request, from the PLS 232, for generation and insertion of the one or more tags at one or more event opportunity points within the programming media content of the first media stream may be transmitted to the TS 234. Such tags may be invoked at the client device 102 during playout of the programming media content within the first media stream and therefore, may facilitate enablement of modifications in the display view of the client device 102 and concurrent presentation of the one or more non-programming media assets, such as advertisements, promos, trailers, and recaps, along with the programming media content.

Based on the received request, the TS 234 may transmit a request to the MAS 236 to provide one or more event opportunity points within the programming media content and identify information associated with the one or more non-programming media assets for presentation at the determined one or more event opportunity points. In response to the received request from the TS 234, the MAS 236 may determine the one or more event opportunity points within the programming media content of the first media stream and identify the information associated with the one or more non-programming media assets. Example of the information associated with the one or more non-programming media assets may include, but are not limited to, contexts, durations, asset type, and goal definitions. The information may be used to derive context tags, preference tags associated the one or more preferences of the user 116 or goals tags for the one or more non-programming media assets. Each event opportunity point may correspond to a specified event within the programming media content and such specified event may correspond to, but not limited to, start credits, end credits, lull points, time-based marked regions, location-based marked regions, context-based marked regions, explicit scene start and end, and product placement opportunities, within the programming media content.

In a first example, an episode of a kids cartoon program may comprise a starting credit and an ending credit for a production company, and crew behind the episode, a first lull point where a character is constantly running for "1 minute", a second lull point where a character is standing still for "40 seconds", and a contextually relevant point where another character is having dog food.

In a second example, an episode of a prime-time news program may be based on a debate between an anchor and one or more participants. Such episode may comprise end credits for the news cast, a first lull point at a time when the anchor is waiting for the one or more participants to speak, a second lull point when a participant is engaged in an irrelevant discussion with other participants or the anchor, and a contextually relevant point when the news anchor sips a cup of coffee.

The MAS 236 may identify the one or more event opportunity points, such as credits, lull points, and contextually relevant points from the programming media content, such as the episodes in the first example and the second example. A duration, and associated metadata for each determined event opportunity point may be determined by the MAS 236. In accordance with an embodiment, the MAS 236 may determine the one or more event opportunity points based on content recognition of the programming media content within the first media stream. In accordance with another embodiment, the MAS 236 may determine the one or more event opportunity points based on semantic or context mining of the programming media content within the first media stream.

The MAS 236 may identify the information associated with the one or more non-programming media assets for playback at the determined one or more event opportunity points within the programming media content, in conjunction with the CS 224. In accordance with an embodiment, the information associated with the one or more non-programming media assets may be identified based on a degree of a correlation of a context of the one or more non-programming media assets with a corresponding context of the one or more event opportunity points within the programming media content. The one or more non-programming media assets may be selected for the concurrent presentation with the programming media content based on significant degree of correlation of the determined context of the one or more non-programming media assets with the programming media content. In accordance with another embodiment, the information associated with the one or more non-programming media assets may be identified based on a retrieval of a set of user-preferences for the user 116 associated the client device 102, and selection of the one or more non-programming media assets for concurrent presentation with the programming media content based on the retrieved set of user-preferences. Such retrieval of the set of user-preferences and the associated selection of the one or more non-programming media assets may be performed by the MAS 236. In accordance with yet another embodiment, the one or more non-programming media assets may be identified based on one or more goals defined by the GMS 240. Example of the one or more goals may include, but are not limited to, impressions, reach, clicks, views, and sales for the offerings associated with the one or more non-programming media assets.

Referring to the first example and the second example, the MAS 236 may identify information associated with an advertisement for a dog food offering at the contextually relevant point within the episode, and another advertisement for a coffee offering may be identified by the MAS 236 for the contextually relevant point. The MAS 236 may identify information associated with a promotional trailer of a new movie at the lull points and a recap of the next program at the credit points within the episode.

The MAS 236 may transmit the determined one or more event opportunity points, associated metadata, and the identified information associated with the one or more non-programming media assets to the TS 234. The TS 234 may be configured to generate the one or more tags, associated metadata, and resources for the programming media content within the first media stream. The generation of each of the one or more tags may be performed for the determined one or more event opportunity points within the programming media content. The generated one or more tags may be inserted by the TS 234 at the determined at least one event opportunity point within the programming media content. Each tag may specify at least one modification of the display view, a pointer to a duration of the corresponding event opportunity point within the programming media content, a descriptor of the corresponding identified one or more non-programming media assets to be presented with the programming media content at the client device 102.

An encapsulation may be performed by the PLS 232 on the encoded programming media content, as received from the SS 230, to obtain a first media stream of the programming media content, which may correspond to a transport media stream, such as an MPEG-2 TS stream. The PLS 232 may encrypt the first media stream for secure playout at the client device 102 associated with the user 116. The encrypted media stream may be segmented by the PLS 232 into one or more segments, and such encrypted media stream may be segmented to facilitate adaptive bitrate streaming (ABS) over to the client device 102, via the communication network 114 in light of an availability of network bandwidth for the client device 102. The PLS 232 streams the encrypted first media stream, inserted with the one or more tags, to the client device 102, via the communication network 114. The transmission of the first media stream to the client device 102 may be performed via one of the HLS technique, the DASH technique, or any suitable digital streaming technique.

In accordance with an embodiment, the TS 234 may be configured to generate a client manifest of the first media stream of the programming media content. The client manifest may correspond to a data structure for at least the one or more tags, uniform resource identifiers (URIs) for the one or more segments, URIs for the one or more non-programming media assets, metadata for the tags, and the like. The client manifest may be transmitted along with the first media stream to the client device 102, via the communication network 114.

As the client device 102 plays the programming media content within the first media stream at the display view, the presentation engine 208 (See FIG. 2A) of the client device 102 may detect the one or more tags at one or more occurrences of the one or more event opportunity points within the programming media content at a playback time of the programming media content. As each tag may be detected within the programming media content, the modification engine 206 (FIG. 2A) of the client device 102 may be configured to modify the display view with the one or more modifications for a defined duration of the programming media content. Prior to modification, the modification engine 206 of the client device 102 may be configured to seek permissions/rights from the EOS 238 of the media presentation and distribution system 108 to apply the one or more modifications to the display view of the client device 102. Therefore, the modification engine 206 of the client device 102 may generate and transmit a request to the EOS 238, in conjunction with the request engine 204 (See FIG. 2A), to select the one or more event opportunity points with the one or more occurrences of the one or more event opportunity points within the programming media content. Additionally, the request may be transmitted along with the one or more occurrences of the one or more event opportunity points to the EOS 238, via the communication network 114.

Accordingly, the EOS 238 may receive, from the client device 102, request and the associated one or more occurrences of the one or more event opportunity points within the programming media content, as identified by the modification engine 206 of the client device 102. The EOS 238 may be configured to operate as the ESAM server, which may manage execution, performance and personalization of the programming media content and the one or more non-programming media assets for the user 116 and the select the one or more modifications in the display view of the client device 102. In other words, the EOS 238 may be an event decisioning system that may be configured to respond to each request from the client device 102. Example of such request may include, but are not limited to, a response over the received one or more occurrences of the one or more event opportunity points in the programming media content, a response over the one or more modifications to be performed at the display view, a response over selection the one or more non-programming media assets for presentation at the playback time, and the like. The EOS 238 may select the one or more event opportunity points based on a defined criteria, which may be based on at least one of, or a combination thereof, but not limited to, the retrieved set of user-preferences, the one or more goals, a measured attention of the user 116 associated with the client device 102, time constraints, inventory constraints, and user-defined constraints.

As an example, a user may define a user-defined constraint of "5 promotional content" per week and therefore, the EOS 238 may factor such user-defined constraint for the selection of the one or more event opportunity points.

As another example, a certain advertisement of a coffee brand may be associated with a goal to achieve "1 Million impressions" in a "1 week flight", and therefore, the EOS 238 may factor the goal for the selection of the one or more event opportunity points.

As yet another example, the client device 102 may identify that the user has muted the programming media content played out at the display view of the client device 102 and may provide the mute status to the EOS 238, via the communication network 114. The EOS 238 may factor such mute status (as of user-defined lull duration) for the selection of the one or more event opportunity points.

The EOS 238 may be communicatively coupled with the GMS 240, the NS 244 and the VS 246, and therefore, the EOS 238 may improve or factor decisions on the received requests from the client device 102 based on communication from the GMS 240, the NS 244 or the VS 246. As for the selection of the one or more event opportunity points, the EOS 238 may be configured to further control the one or more modifications in the display view of the client device 102 for the defined duration. The one or more modifications may be controlled based on decisions to select specific one or more modifications and playout of the one or more non-programming media assets for the user 116 associated with the client device 102. In accordance with an embodiment, the one or more modifications in the display view of the client device 102 may include, but is not limited to, a squeeze-back of the programming media content to a defined region within the display view, an overlay over the defined region within the display view, and a partitioned view of the display view. Such one or more modifications may be personalized based on the retrieved set of user-preferences.

The CMS 242 may receive a request, from the presentation engine 208 of the client device 102, to provide the identified one or more non-programming media assets for playback at the determined one or more event opportunity points within the modified display view of the client device 102. The CMS 242 may be configured to manage retrieval and delivery of a second media stream of the identified one or more non-programming media assets to the client device 102, via the communication network 114 in response to the received request from the presentation engine 208. Based on the received request, the CMS 242 may manage preparation of the second media stream of the identified one or more non-programming media assets, encrypt, encapsulate and transmit the second media stream to the client device 102. The first media stream and the second media stream may be transmitted at the client device 102 as concurrent media streams, and each of the first media stream and the second media stream may be managed concurrently via at least one independent thread at the client device 102 or at the media presentation and distribution system 108.

The EOS 238 may be further configured to instruct the presentation of the one or more non-programming media assets, from the second media stream for the defined duration and at the modified display view of the client device 102, concurrently with the playback of the programming media content from the first media stream. The concurrent presentation of the first media stream with the identified one or more non-programming media assets from the second media stream increases a likelihood of an engagement of the user 116 associated with the client device 102. Such engagement is improved based on a targeted selection of the one or more event opportunity points to improve the attention span of the user 116, engaged with the client device 102. The instruction for the presentation may pertain to at least an encoding of the programming media content and the retrieved one or more non-programming media assets to a defined scale, size, resolution, aspect ratio of an allocated region or partition within the modified display view, an allocation of the programming media content and the encoded one or more non-programming media assets at the allocated partition or the defined region within the modified display view of the client device 102.

For example, a user may be engaged with an NBA match, played on-demand at the display view of the client device 102 associated with the user. A time-out or foul happens during the NBA match and based on a tag at the foul time or the time-out, the modification engine 206 may request selection of the event opportunity from the EOS 238. The EOS 238 may identify that the user has a preference for a specific player "X" in the NBA match, and therefore, the EOS 238 may identify a "Beverage advertisement" that is promoted by the player "X" and instruct the CMS 242 to transmit the "Beverage Advertisement" to the client device 102. The EOS 238 may further select a modification to partition the display view into two rectangular partitions and may further decide a scale, size, and aspect ratio of the partitions.

The NS 244 may be configured to generate and serve one or more notifications to at least the display view of the client device 102, one or more delivery platforms, or one or more delivery devices 112, associated with the client device 102 of the user 116. Based on a defined set of rules, the one or more notifications may be generated for the one or more event opportunity points within the programming media content. Such one or more notifications may be intended to at least inform the user 116 about a presented non-programming media asset, an engagement of the user 116 with the presented non-programming media asset, a promotional offer on the promoted offering in the presented non-programming media asset, and the like. The defined set of rules for generation of the one or more notifications may comprise a user-defined constraint, a client-device constraint, a defined goal of impressions, reach or views, a defined time of generation of the at least one notification, and a specified type of the one or more notifications, for example, push, pop-up, fixed, and interactive notifications. Each of the one or more notifications may provide at least one selectable option to provide a request for at least one service. Such service may correspond to an engagement of the user 116 with the offering presented in the corresponding non-programming media asset. The NS 244 may be further configured to receive a request based on a response from the user 116 over the served one or more notifications. Example of the one or more services may include, subscriptions, payments, registrations, upgrades, updates, purchases, transactions, signup, sign in, for at least one product, service or event offering, which may be promoted by the presented one or more non-programming media assets with the programming media content. Additionally, the NS 244 may transmit the responses over the requests received over the served one or more notifications to the EOS 238. The EOS 238 may be configured to instruct the presentation of the one or more non-programming media assets or the programming media content for the received request from the user 116.

For example, a user may be engaged with a playback of an NFL match at the client device 102. With a modification in the display view at a foul time in the NFL match, an advertisement of a "Health Drink" may be played out within the modified display view along with the NFL match. A notification with to "Purchase" or to select "Not Interested" for the "Health Drink" may be served on a portable smartphone of the user associated with the client device 102. The user may select the "Not Interested" option, and therefore, the EOS 238 may filter out every future advertisement that is associated with the "Health Drink" and update the dislikes field in the user database with the "Health Drink" and associated semantic relationship models for the user.

The VS 246 may be configured to verify an enablement of the one or more modifications in the display view of the client device 102 and the scheduled presentation of each of the one or more non-programming media assets within the modified display view or an unmodified display view at the client device 102. Such client-side verification may be based on one or more techniques, which may identify at least one deviation in the modified display view and the presentation of the programming media content and the one or more non-programming media assets. Example of the one or more deviations may include, but are not limited to, a partial overlay, a color imbalance, an error with transition or overlay, an abrupt disappearance of the one or more non-programming media assets or the programming media content from the modified display view, and a non-responsive playback of the one or more non-programming media assets. In response to the detection of the one or more deviations, the VS 246 may be configured to trigger, in conjunction with the media presentation and distribution system 108, at least one circuitry or programmable routine to adjust or correct the detected one or more deviations in the presentation of the programming media content and the one or more non-programming media assets within the modified display view as well as the one or more modifications in the display view of the client device 102.

The operations of each component of the media presentation and distribution system 108 may be monitored, instructed, and calibrated, via at least one control signal, by the MS 248A, the CCS 248B, and the OMS of the CU 248. Each component may monitored, instructed, and calibrated for synchronized and lag-free operations for the requests received from the client device 102.

Figure 3A:
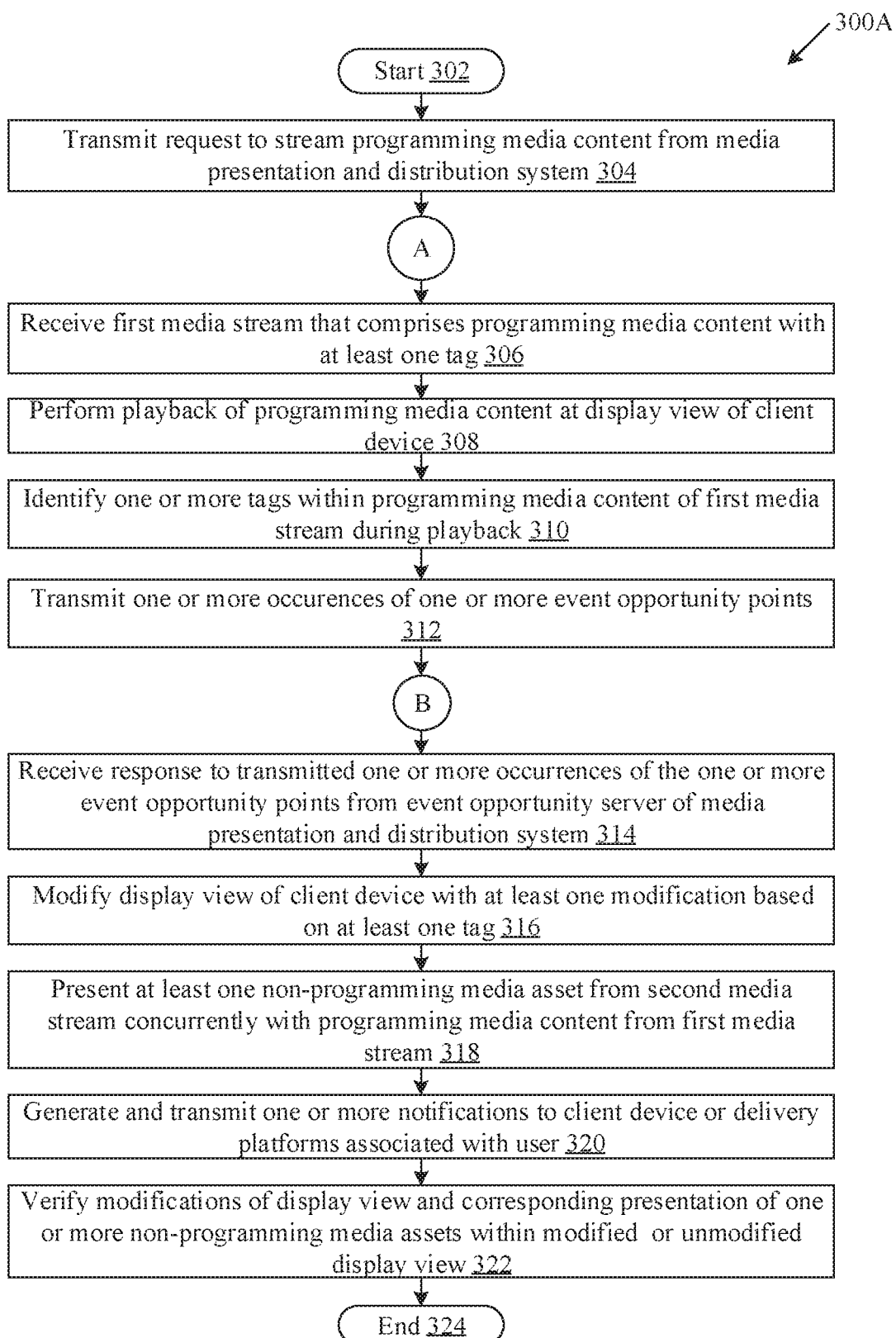
FIG. 3A is a flow chart that illustrates exemplary operations for client-side concurrent presentation of non-programming media assets and programming media content by the exemplary client device of FIG. 2A, in accordance with another exemplary embodiment of the present disclosure.

FIG. 3A is a flow chart that illustrates exemplary operations for client-side concurrent presentation of non-programming media assets and programming media content, in accordance with an exemplary embodiment of the present disclosure. The exemplary operations for the client-side concurrent presentation of non-programming media assets and programming media content may be performed by the exemplary client device 102 of FIG. 2A. FIG. 3A may be described in conjunction with FIG. 1, FIG. 2A, and FIG. 2B. Referring to FIG. 3A, there is shown a flow chart 300A comprising exemplary operations from 302 through 324. The exemplary operations for the client-side concurrent presentation of the non-programming media assets with the programming media content may start at 302 and proceed to 304.

At 304, a request to stream programming media content may be transmitted to the media presentation and distribution system 108. In accordance with an embodiment, the request engine 204 of the client device 102 may be configured to transmit the request to the media presentation and distribution system 108 to stream the programming media content. The request may be associated with at least one preference of the user 116 for the programming media content and may correspond to personalization of the programming media content, for example, VOD media content (as described in detail in FIG. 2A).

Control passes to 328 of the flowchart 300B, proceeds till 342 of the flowchart 300B, and returns to 306 of the flowchart 300A.

At 306, a first media stream of the programming media content with one or more tags may be received from the media presentation and distribution system 108. In accordance with an embodiment, the client device 102 may be configured to receive the first media stream of the programming media content from the media presentation and distribution system 108 (as described in detail in FIG. 2A).

At 308, a playback of the programming media content within the first media stream may be performed within the display view of the client device 102. In accordance with an embodiment, the presentation engine 208 of the client device 102 may be configured to play the programming media content within the first media stream in a display view of a display circuitry in the client device 102 (as described in detail in FIG. 2A).

At 310, one or more tags may be identified within the programming media content, at the playback time, of the programming media content within the first media stream. In accordance with an embodiment, the modification engine 206 may be configured to identify the one or more tags, at the playback time, within the programming media content of the first media stream. Each of the one or more tags may determine an event opportunity point within the programming media content of the first media stream (as described in detail in FIG. 2A).

At 312, one or more occurrences of the one or more event opportunity points may be transmitted to the EOS 238 of the media presentation. In accordance with an embodiment, the modification engine 206 may be configured to transmit the one or more occurrences of the one or more event opportunity points within the programming media content of the first media stream (as described in detail in FIG. 2A). Control passes to 342 of the flowchart 300B, proceeds till 346 of the flowchart 300B, and returns to 314 of flowchart 300A.

At 314, a response to the transmitted one or more occurrences of the one or more event opportunity points may be received at the client device 102. In accordance with an embodiment, the modification engine 206 may be configured to receive the response to the transmitted one or more occurrences of the one or more event opportunity points from the EOS 238 0f the media presentation and distribution system 108. (as described in detail in FIG. 2A).

At 316, one or more modifications may be performed in the display view of the client device 102. In accordance with an embodiment, the modification engine 206 may be configured to modify the display view with the one or more modifications. The one or more modifications in the display view of the client device 102 may include, but is not limited to, a squeeze-back of the programming media content to the defined region within the display view, an overlay over the defined region within the display view, and a partitioned view of the display view. Such modifications may be personalized for the user 116 based on a retrieved set of user-preferences for the user 116 (as described in detail in FIG. 2A).

At 318, one or more non-programming media assets may be presented concurrently with the programming media content within the modified display view of the client device 102. In accordance with an embodiment, the presentation engine 208 may be configured to present the one or more non-programming media assets concurrently with the programming media content within the modified display view of the client device 102 (as described in detail in FIG. 2A).

At 320, one or more notifications may be generated at the client device 102 during the playback of the programming media content. In accordance with an embodiment, the notification engine 214 may be configured to generate and serve the one or more notifications to at least the one or more delivery devices 112 associated with the user 116 or one or more delivery platforms on the client device 102 (as described in detail in FIG. 2A).

At 322, a verification may be performed for the one or more modifications of the display view and corresponding presentation of the one or more non-programming media assets within modified display view of the client device 102. In accordance with an embodiment, the verification engine 210 may be configured to verify the one or more modifications of the display view and corresponding presentation of the one or more non-programming media assets within modified display view or an unmodified display view (as described in detail in FIG. 2A). Control ends at 324.

Figure 3B:
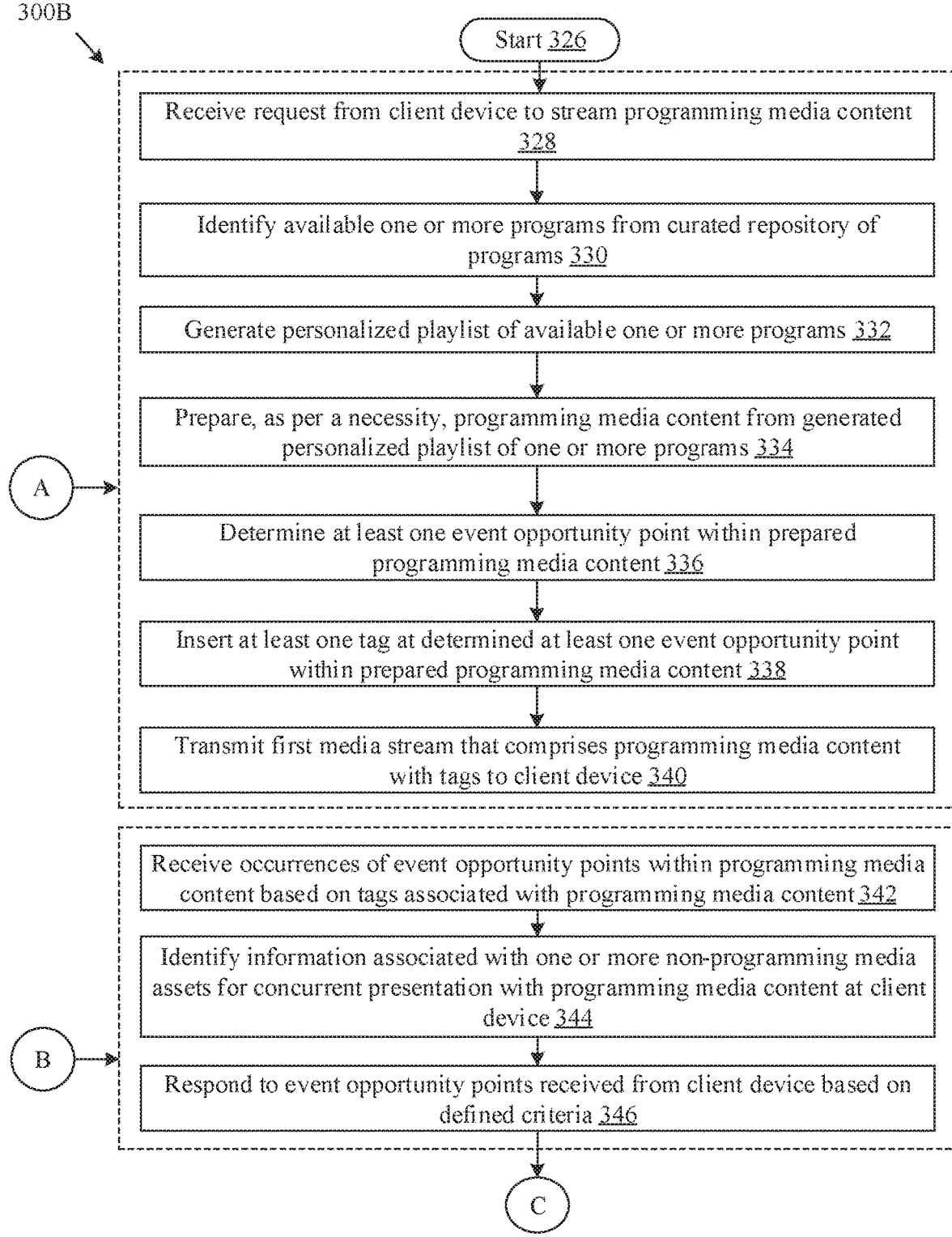
FIG. 3B and FIG. 3C are flow charts that illustrate exemplary operations to enable client-side concurrent presentation of non-programming media assets and programming media content by the exemplary media presentation and distribution system of FIG. 2B, in accordance with an exemplary embodiment of the present disclosure.
Figure 3C:
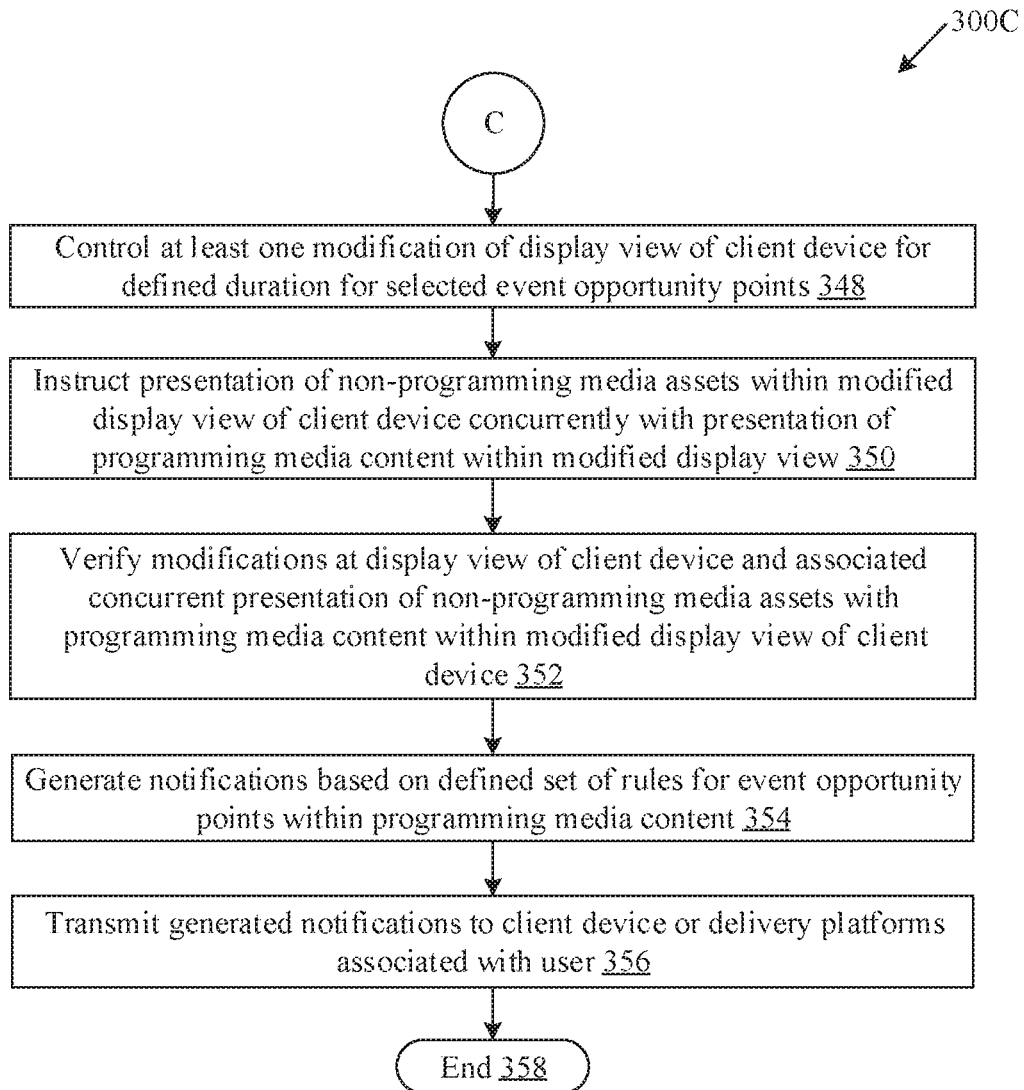

FIG. 3B and FIG. 3C is a flow chart that illustrates exemplary operations for client-side concurrent presentation of non-programming media assets and programming media content, in accordance with another exemplary embodiment of the present disclosure. The exemplary operations for the client-side concurrent presentation of non-programming media assets and programming media content may be performed by the exemplary media presentation and distribution system 108 of FIG. 2B. FIG. 3B and FIG. 3C may be described in conjunction with FIG. 1, FIG. 2A, FIG. 2B and FIG. 3A. Referring to FIG. 3B and FIG. 3C, there is shown a flow chart 300B comprising exemplary operations from 326 through 358. The exemplary operations for the management and delivery of services may start at 326 and proceed to 328.

At 328, a request may be received from the client device 102 to stream the programming media content. In accordance with an embodiment, the PS 218 in the media presentation and distribution system 108 may be configured to receive the request, from the client device 102, to stream the programming media content (as described in detail in FIG. 2B).

At 330, an available one or more programs may be identified from a curated repository of programs. In accordance with an embodiment, the CDS 222 in the media presentation and distribution system 108 may be configured to identify the available one or more programs from the curated repository of programs (as described in detail in FIG. 2B).

At 332, a personalized playlist of the one or more programs may be generated for the identified one or more programs. In accordance with an embodiment, the PPG 226 may be configured to generate the personalized playlist of the one or more programs, identified by the CDS 222 (as described in detail in FIG. 2B).

At 334, programming media content may be scheduled based on the personalized playlist of the one or more programs. In accordance with an embodiment, the SS 230 may be configured to schedule the programming media content that comprises the identified one or more programs (as described in detail in FIG. 2B).

At 336, at least one event opportunity point may be determined within the prepared programming media content. In accordance with an embodiment, the MAS 236 may be configured to determine the one or more event opportunity points within the programming media content (as described in detail in FIG. 2B).

At 338, one or more tags may be inserted at the determined one or more event opportunity points within the prepared programming media content. In accordance with an embodiment, the TS 234 may be configured to generate and insert the one or more tags at the determined one or more event opportunity points within the prepared programming media content. The generated one or more tags may be associated with descriptors for the identified information associated with the one or more non-programming media assets (as described in detail in FIG. 2B).

At 340, a first media stream of the programming media content, inserted with the one or more tags, may be transmitted to the client device 102. In accordance with an embodiment, the PLS 232 may be configured to transmit the first media stream of the programming media content, ready for playout, to the client device 102, via the communication network 114 (as described in detail in FIG. 2B).

At 342, one or more occurrences of the one or more event opportunity points within the programming media content of the first media stream may be received from the client device 102. The EOS 238 may be configured to receive the one or more occurrences of the one or more event opportunity points within the programming media content (as described in detail in FIG. 2B).

At 344, information associated with the one or more non-programming media assets may be identified for concurrent presentation with the programming media content. In accordance with an embodiment, the MAS 236 may be configured to identify information associated with the one or more non-programming media assets for the concurrent presentation with the programming media content (as described in detail in FIG. 2B).

At 346, a response to the received one or more occurrences of the one or more event opportunity points may be performed. In accordance with an embodiment, the EOS 238 may be configured to respond to the received one or more occurrences of the one or more event opportunity points. The response may include a selection of the one or more event opportunity points may be based on a defined criteria, which may be based on at least one of, or a combination thereof, but not limited to, a retrieved set of user-preferences, at least one defined goal, a measured attention of the user 116 associated with the client device 102, time constraints, inventory constraints, and user-defined constraints (as described in detail in FIG. 2B).

At 348, one or more modifications in a display view of the client device 102 may be controlled for a defined duration of playout for the corresponding one or more event opportunity points within the programming media content. In accordance with an embodiment, the EOS 238 may be configured to control the one or more modifications in the display view of the client device 102 for the defined duration of the playout of the corresponding one or more event opportunity points within the programming media content (as described in detail in FIG. 2B).

At 350, a concurrent presentation of the one or more non-programming media assets with the programming media content may be instructed within the modified display view of the client device 102. In accordance with an embodiment, the EOS 238, in conjunction with the CMS 242, may be configured to instruct the concurrent presentation of the one or more non-programming media assets with the programming media content (as described in detail in FIG. 2B).

At 352, a verification of the one or more modifications in the display view and associated concurrent presentation of the one or more non-programming media assets with the programming media content within the modified display view may be performed. In accordance with an embodiment, the VS 246 may be configured to verify the one or more modifications in the display view of the client device 102 and associated concurrent presentation of the one or more non-programming media assets with the programming media content within the modified display view of the client device 102 (as described in detail in FIG. 2B).

At 354, one or more notifications may be generated based on a defined set of rules for the one or more event opportunity points within the programming media content. In accordance with an embodiment, the NS 244 may be configured to generate the one or more notifications based on the defined set of rules for the one or more event opportunity points within the programming media content (as described in detail in FIG. 2B).

At 356, the generated one or more notifications may be transmitted to the client device 102 or the one or more delivery platforms associated with user 116. The NS 244 may be further configured to transmit the generated one or more notifications to the client device 102 or the one or more delivery platforms (for example, emails, pop ups, push notifications, and the like) associated with user 116. Control ends at 358.

Figure 4A:
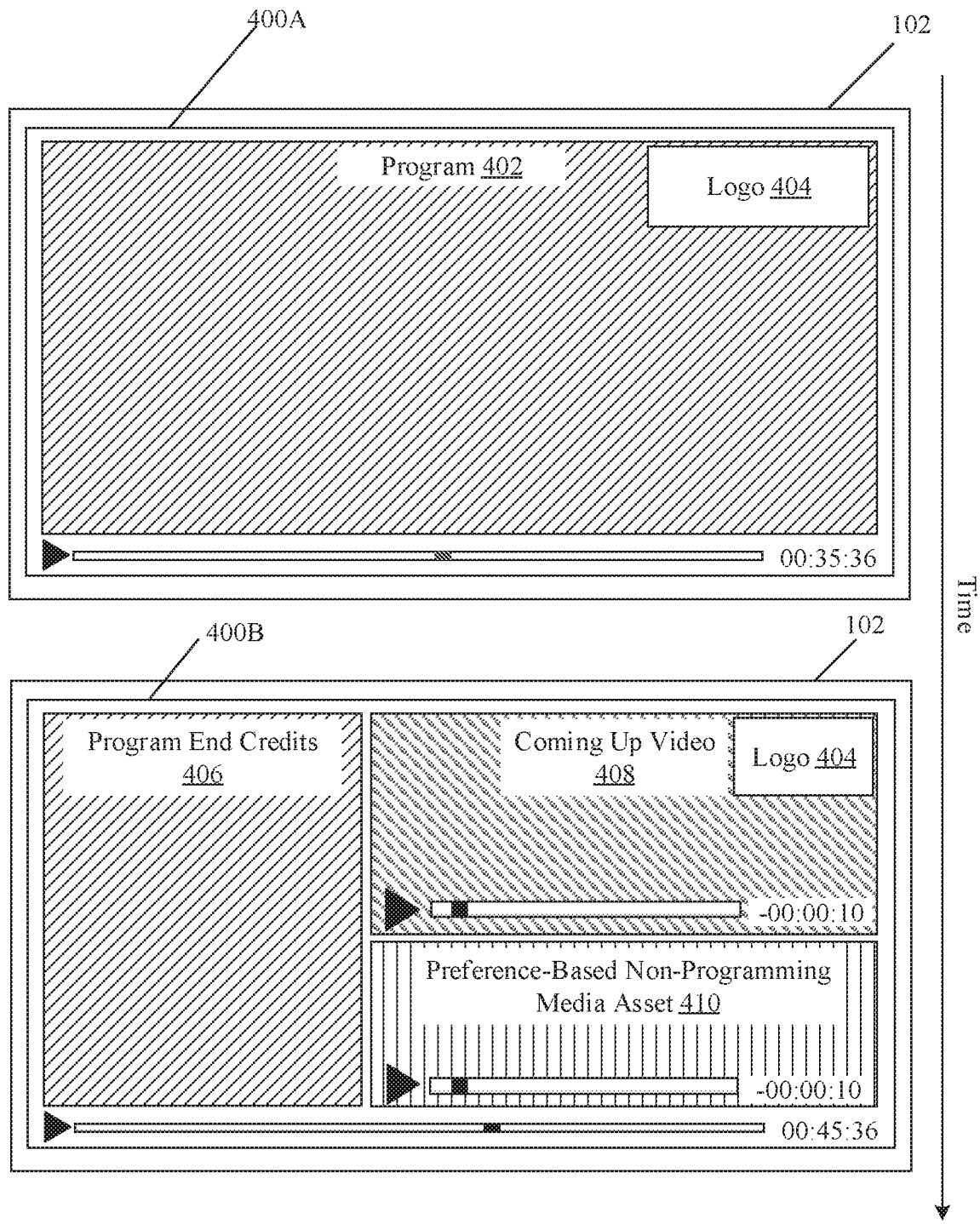
FIG. 4A illustrates an example of a display view of the client device during the concurrent presentation of the non-programming media assets with the programming media content, in accordance with an embodiment of the present disclosure.

FIG. 4A illustrates an example of a display view of the client device 102 during the concurrent presentation of non-programming media assets and programming media content, in accordance with an embodiment of the present disclosure. FIG. 4A may be described in conjunction with the FIG. 1, FIG. 2A, and FIG. 2B. Referring to FIG. 4A, there is shown a timelined display view of the client device 102. The timelined display view of the client device 102 may comprise a display view 400A and a modified display view 400B of the client device 102.

The display view 400A may display a media player to play a program 402 at a first time, such as "00:35:36". The user 116 may be engaged with the program 402, as played by the media player at the display view 400A of the client device 102. A logo 404 may be rendered by the media player during the playback of the programming media content. The program 402 may be played out from a first media stream of the programming media content, which may be personalized for the user 116. The program 402 may end at a second time "00:45:36" and a tag may be present at the second time. The tag may specify an event opportunity that may correspond to playback of program end credits 406. As the client device 102 detects the tag at the first time, a request to select the identified event opportunity is transmitted to the EOS 238 of the media presentation and distribution system 108. The EOS 238 may select or reject the event opportunity, which may further depend on the defined criteria for selection, such as a defined goal, a user-defined constraint, a device-constraint, and an inventory constraint. As the event opportunity is selected, the modification engine 206 of client device 102 may further modify the display view 400A of the client device 102 to the modified display view 400B at the second time, in conjunction with the graphics engine 110 of the client device 102.

The modified display view 400B may comprise one or more partitions to concurrently present the programming media content and the one or more non-programming media assets within each of the one or more partitions of the modified display view 400B. A coming up video 408 and a preference-based advertisement video 410 may be identified by the EOS 238 and transmitted to the client device 102. The presentation engine 208, in conjunction with the graphics engine 110 of the client device 102, may be configured to encode each of the one or more non-programming media assets and the programming media content to a defined scale, size, aspect ratio, and resolution as per an allocated partition (defined region) within the modified display view 400B of the client device 102. The encoded one or more non-programming media assets may comprise the coming up video 408 and the preference-based advertisement video 410. The program end credits 406, and the encoded one or more non-programming media assets may be played out at the second time within the allocated partitions of the modified display view 400B of the client device 102.

Figure 4B:
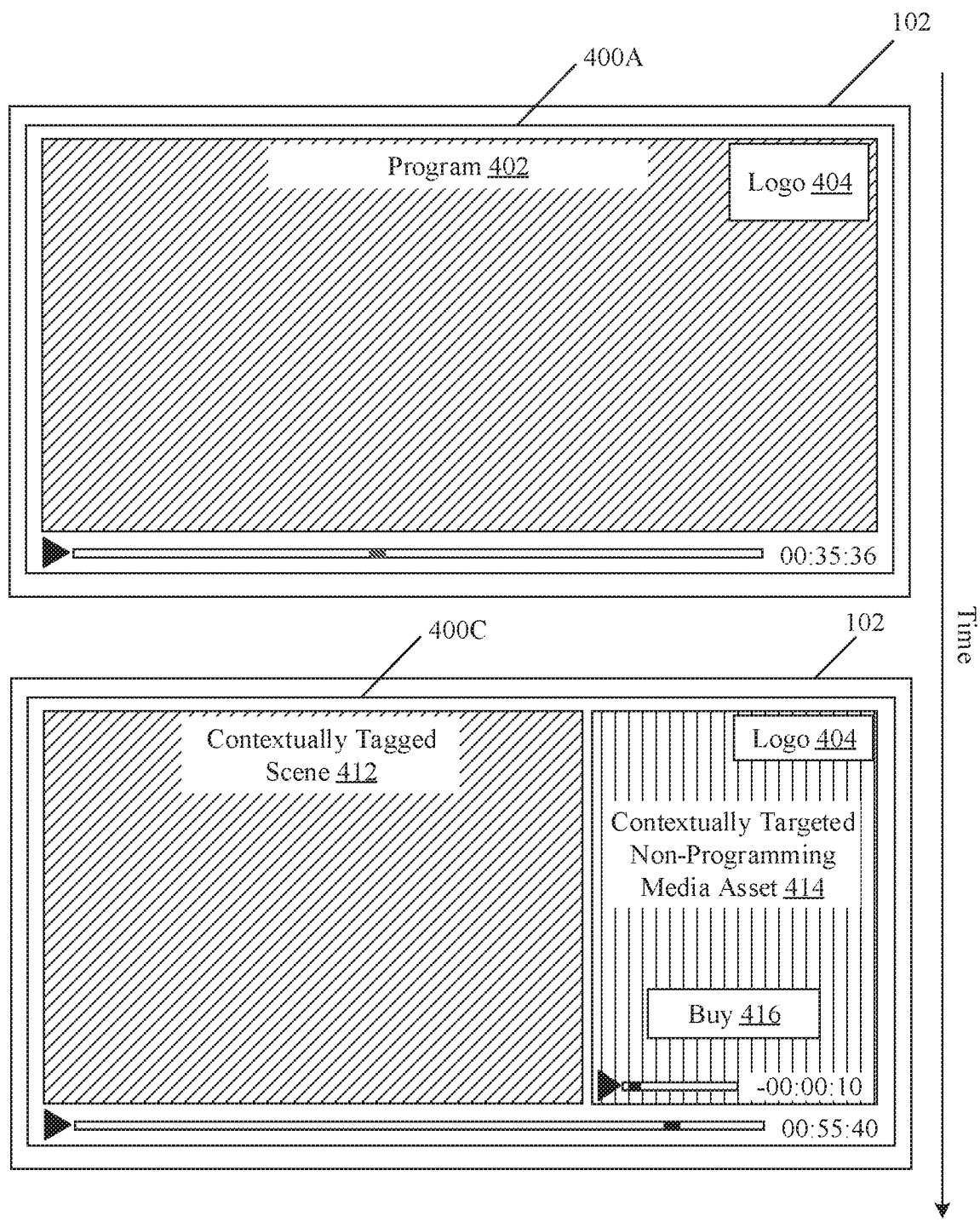
FIG. 4B illustrates an example of a display view of the client device during the concurrent presentation of the non-programming media assets with the programming media content, in accordance with an embodiment of the present disclosure.

FIG. 4B illustrates an example of a display view of the client device 102 during the concurrent presentation of the non-programming media assets with the programming media content, in accordance with an embodiment of the present disclosure. FIG. 4B may be described in conjunction with the FIG. 1, FIG. 2A, FIG. 2B and FIG. 4A. Referring to FIG. 4B, there is shown a timelined display view of the client device 102. The timelined display view of the client device 102 may comprise a display view 400A and a modified display view 400C of the client device 102.

The display view 400A may display the media player to play the program 402 at the first time, such as "00:35:36". The user 116 may be engaged with the program 402, as played by the media player at the display view 400A of the client device 102. A logo 404 may be rendered by the media player during the playback of the programming media content. The program 402 may be played out from the first media stream of the programming media content, which may be personalized for the user 116. A contextually tagged scene 412 may be played within the program 402 at a third time "00:55:40" and a tag may be present at the third time, which may specify an event opportunity for corresponding at the playback of contextually tagged scene 412. As the client device 102 detects the tag at the third time, a request to select the identified event opportunity is transmitted to the EOS 238 of the media presentation and distribution system 108. The EOS 238 may select or reject the event opportunity, which may further depend on the defined criteria for selection, such as a defined goal, a user-defined constraint, a device-constraint, and an inventory constraint. As the event opportunity is selected, the modification engine 206 of client device 102 may further modify the display view 400A of the client device 102 to the modified display view 400C at the third time, in conjunction with the graphics engine 110 of the client device 102.

The modified display view 400C may comprise one or more partitions to concurrently present the programming media content and the one or more non-programming media assets within each of the one or more partitions of the modified display view 400C. A contextually targeted video 414, such as a coffee advertisement for a coffee restaurant scene in the program 402, and a buy 416 option may be identified by the EOS 238 and transmitted to the client device 102. The presentation engine 208, in conjunction with the graphics engine 110 of the client device 102, may be configured to encode the contextually targeted video 414, the buy 416 option over the contextually targeted video 414, and the program to a defined scale, size, aspect ratio, and resolution as per an allocated partition (defined region) within the modified display view 400C of the client device 102. The contextually targeted video 414 may be played out along with the contextually tagged scene 412 in the program 402 at the third time within the allocated partitions of the modified display view 400C of the client device 102.

Figure 5A:
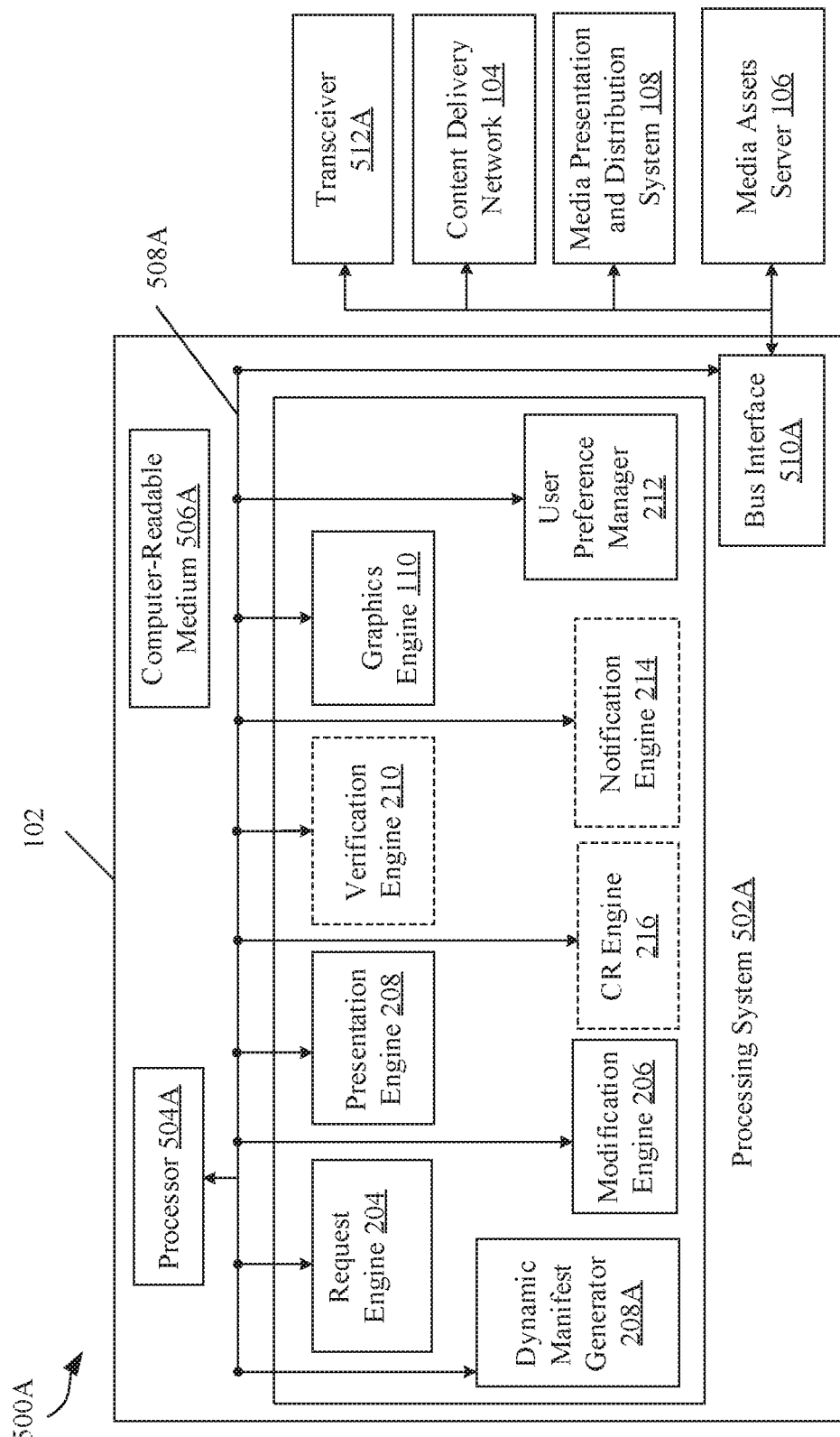
FIG. 5A is a conceptual diagram that illustrates an example of a hardware implementation for a media presentation and distribution system that employs a processing system for client-side concurrent presentation of non-programming media assets and programming media content, in accordance with an exemplary embodiment of the disclosure.

FIG. 5A is a conceptual diagram that illustrates an example of a hardware implementation for the client device 102 that employs a processing system for client-side concurrent presentation of non-programming media assets and programming media content, in accordance with an exemplary embodiment of the disclosure. Referring to FIG. 5A, the hardware implementation is shown by a representation 500A for the client device 102 for client-side concurrent presentation of non-programming media assets and programming media content, in accordance with an exemplary embodiment of the disclosure, as described herein. In some examples, the processing system 502A may comprise one or more hardware processors 504A, a non-transitory computer-readable medium 506A, the request engine 204, the modification engine 206, the presentation engine 208, the verification engine 210, the notification engine 214, the graphics engine 110, and the user manager 212.

In this example, the client device 102 that employs the processing system 502A may be implemented with bus architecture, represented generally by a bus 508A. The bus 508A may include any number of interconnecting buses and bridges depending on the specific implementation of the client device 102 and the overall design constraints. The bus 508A links together various circuits including the one or more processors, represented generally by the hardware processor 504A, the non-transitory computer-readable media, represented generally by the computer-readable medium 506A, the request engine 204, the modification engine 206, the presentation engine 208, the verification engine 210, the notification engine 214, the graphics engine 110, and the user manager 212 which may be configured to carry out one or more operations or methods described herein. A bus interface 510A provides an interface between the bus 508A and a transceiver 512A. The transceiver 512A facilitates communication via the communication network 114 (FIG. 1) with various other apparatus, such as the CDN 104, the media presentation and distribution system 108, and the media assets server 106.

The hardware processor 504A may be configured to manage the bus 508A and general processing, including the execution of a set of instructions stored on the computer-readable medium 506A. The set of instructions, when executed by the hardware processor 504A, causes the client device 102 to execute the various functions described herein for any particular apparatus. The computer-readable medium 506A may also be used for storing data that is manipulated by the hardware processor 504A when executing the set of instructions. The computer-readable medium 506A may also be configured to store data for one or more of the request engine 204, the modification engine 206, the presentation engine 208, the verification engine 210, the notification engine 214, the graphics engine 110, and the user manager 212.

In accordance with an aspect of the disclosure, the hardware processor 504A, the computer-readable medium 506A, or a combination of both may be configured or otherwise specially programmed to execute the operations or functionality of the request engine 204, the modification engine 206, the presentation engine 208, the verification engine 210, the notification engine 214, the graphics engine 110, and the user manager 212, or various other components described herein. For example, the hardware processor 504A, computer-readable medium 506A, or a combination of both may be configured or otherwise specially programmed to perform the operations and functionality of the request engine 204, the modification engine 206, the presentation engine 208, the verification engine 210, the notification engine 214, the graphics engine 110, and the user manager 212 as described with respect to FIGS. 1, 2A, 2B, 3A, 3B, 3C, 4A, and 4B.

Figure 5B:
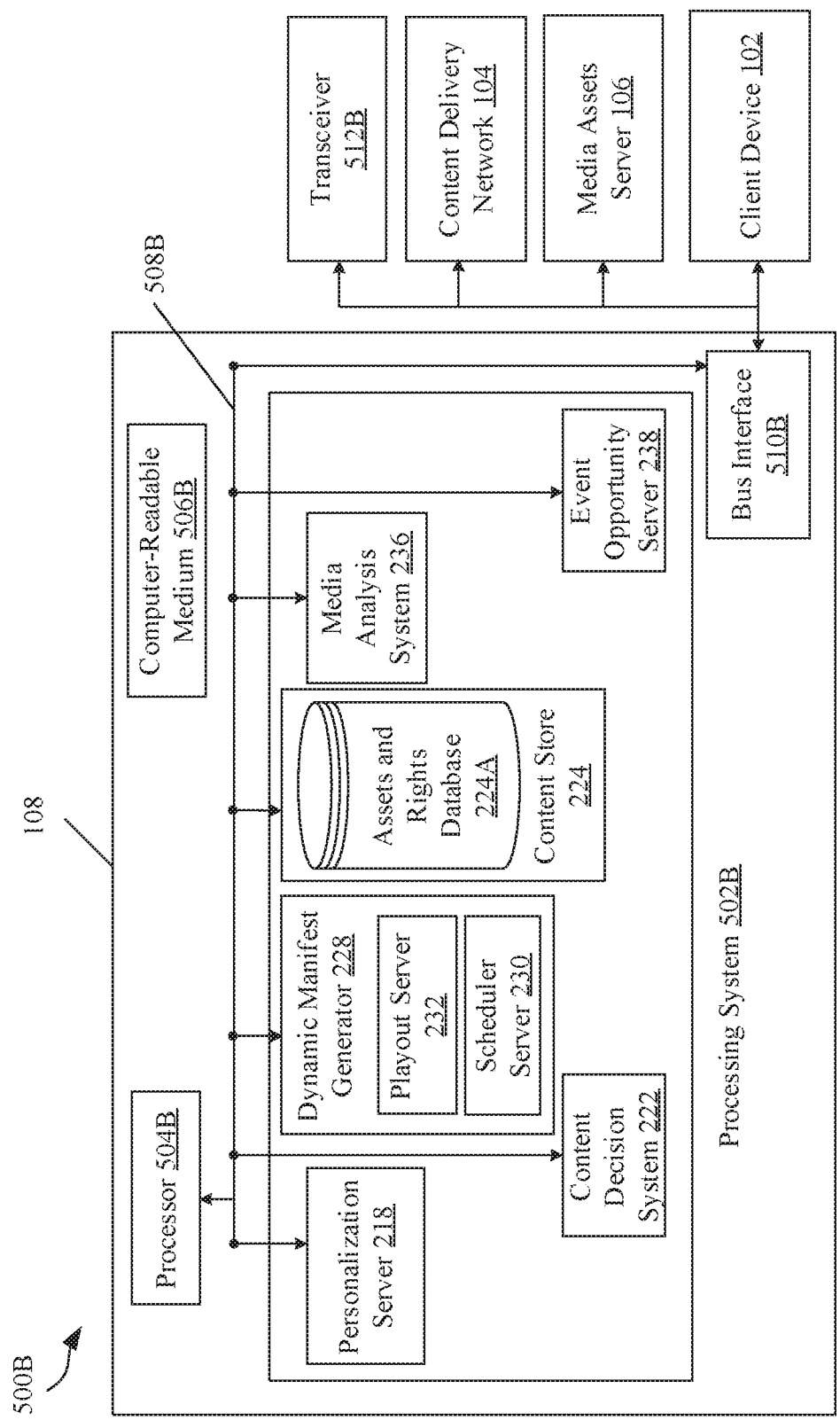
FIG. 5B is a conceptual diagram that illustrates an example of a hardware implementation for a media presentation and distribution system that employs a processing system for client-side concurrent presentation of non-programming media assets and programming media content, in accordance with an exemplary embodiment of the disclosure.

FIG. 5B is a conceptual diagram that illustrates an example of a hardware implementation for the media presentation and distribution system 108 that employs a processing system for client-side concurrent presentation of non-programming media assets and programming media content, in accordance with an exemplary embodiment of the disclosure. Referring to FIG. 5B, the hardware implementation is shown by a representation 500B for the media presentation and distribution system 108 for client-side concurrent presentation of non-programming media assets and programming media content, in accordance with an exemplary embodiment of the disclosure, as described herein. In some examples, the processing system 502B may comprise the one or more hardware processors 504B, the non-transitory computer-readable medium 506B, the PS 218, the CDS 222, the dynamic manifest generator 228, the PLS 232, the SS 230, the CS 224, the associated assets and rights database 224A, MAS 236, and the EOS 238.

In this example, the media presentation and distribution system 108 that employs the processing system 502B may be implemented with bus architecture, represented generally by the bus 508B. The bus 508B may include any number of interconnecting buses and bridges depending on the specific implementation of the media presentation and distribution system 108 and the overall design constraints. The bus 508B links together various circuits including the one or more processors, represented generally by the hardware processor 504B, the non-transitory computer-readable media, represented generally by the computer-readable medium 506B, the PS 218, the CDS 222, the Dynamic manifest generator 228, the PLS 232, the SS 230, the CS 224 and the associated assets and rights database 224A, MAS 236, and the EOS 238 which may be configured to carry out one or more operations or methods described herein. A bus interface 510B provides an interface between the bus 508B and a transceiver 512B. The transceiver 512B facilitates communication via the communication network 114 (FIG. 1) with various other apparatus, such as the CDN 104, the client device 102, and the media assets server 106.

The hardware processor 504B may be configured to manage the bus 508B and general processing, including the execution of a set of instructions stored on the computer-readable medium 506B. The set of instructions, when executed by the hardware processor 504B, causes the media presentation and distribution system 108 to execute the various functions described herein for any particular apparatus. The computer-readable medium 506B may also be used for storing data that is manipulated by the hardware processor 504B when executing the set of instructions. The computer-readable medium 506B may also be configured to store data for one or more of the PS 218, the CDS 222, the Dynamic manifest generator 228, the PLS 232, the SS 230, the CS 224 and the associated assets and rights database 224A, MAS 236, and the EOS 238.

In accordance with an aspect of the disclosure, the hardware processor 504B, the computer-readable medium 506B, or a combination of both may be configured or otherwise specially programmed to execute the operations or functionality of the PS 218, the CDS 222, the dynamic manifest generator 228, the PLS 232, the SS 230, the CS 224 and the associated assets and rights database 224A, MAS 236, and the EOS 238, or various other components described herein. For example, the hardware processor 504B, computer-readable medium 506B, or a combination of both may be configured or otherwise specially programmed to perform the operations and functionality of the PS 218, the CDS 222, the Dynamic manifest generator 228, the PLS 232, the SS 230, the CS 224 and the associated assets and rights database 224A, MAS 236, and the EOS 238 as described with respect to FIGS. 1, 2A, 2B, 3A, 3B, 3C, 4A, and 4B.

The present disclosure may provide several advantages over the traditional systems for concurrent presentation of non-programming media assets with the programming media content. The bulk of the processes, such as modification of display view and concurrent presentation of non-programming media assets with the programming media content, are shared by the client device and the media presentation and distribution system is left to only identify, package and transmit separate media stream of the programming media content and non-programming media assets to the client device and further to decide over the modifications and presentation of non-programming media assets with the programming media content. As the client device shares the bulk of processes, therefore, such configuration enables a network-bandwidth and memory efficient usage of communication network. Further, as the client device renders, and modifies the display view, the presentation quality of the non-programming media assets is agnostic of variations in the network bandwidth. Additionally, the programming media content and the non-programming media assets are not packaged together and are transmitted as separate media streams to the client device. The client device also renders the non-programming media assets concurrently from the separate media streams. Such concurrency and parallel thread management for achieving such concurrency saves the computations, processing power, and resources of the client device. Therefore, the present disclosure provides a way to shift the processing on the client device without impacting the power consumption, battery usage, or affecting the availability of resources for other processes on the client device. The memory and bandwidth of the communication network is shared among a plurality of users that request access to the programming media content. The bandwidth or memory efficient sharing of processes on the client device facilitates an optimal client-side concurrent presentation of the programming media content with the non-programming media assets.

The modification of the display view and associated concurrent presentation of the non-programming media assets and the programming media content within the modified display view of the client device renders a seamless viewing experience for the user without diverting the attention of the user. The non-programming media assets are selected in a way that the assets may supplement a low interest during the playback of the programming media content at the client device. A likelihood of an engagement of the user associated with the client device increases based on the targeted selection of the event opportunity points. Such targeted selection and presentation at the client device further improves an attention span of the user with the programming media content and the non-programming media assets and therefore, a transient attention span of the user may be converted to a sustained attention span for the non-programming media assets. Such sustainability of attention span improves an audience churn rate or attrition rate for a given media network. The response over notifications may determine an intent of the user with respect to the non-programming media assets and therefore, provide an efficient way to personalize such interests, and target the user with different services that suit the user-preferences.

As utilized herein the terms "circuits" and "circuitry" refer to physical electronic components (i.e. hardware) and any software and/or firmware ("code") which may configure the hardware, be executed by the hardware, and/or otherwise be associated with the hardware. As used herein, for example, a particular processor and memory may comprise a first "circuit" when executing first one or more lines of code and may comprise a second "circuit" when executing second one or more lines of code. As utilized herein, "and/or" means any one or more of the items in the list joined by "and/or". As an example, "x and/or y" means any element of the three-element set {(x), (y), (x, y)}. As another example, "x, y, and/or z" means any element of the sevenelement set {(x), (y), (z), (x, y), (x, z), (y, z), (x, y, z)}. As utilized herein, the term "exemplary" means serving as a non-limiting example, instance, or illustration. As utilized herein, the terms "e.g. and for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

The terminology used herein is for the purpose of describing particular embodiments only and is not intended to be limiting of embodiments of the present disclosure. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs) and graphical processing units (GPUs)), by program instructions being executed by one or more processors, or by a combination of both. Additionally, these sequence of actions described herein can be considered to be embodied entirely within any non-transitory form of computer readable storage medium having stored therein a corresponding set of computer instructions that upon execution would cause an associated processor to perform the functionality described herein. Thus, the various aspects of the present disclosure may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Another embodiment of the present disclosure may provide a non-transitory machine and/or computer readable storage and/or media, having stored thereon, a machine code and/or a computer program having at least one code section executable by a machine and/or a computer, thereby causing the machine and/or computer to perform the steps as described herein to obtain a global workflow sequence.

The present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

Further, those of skill in the art will appreciate that the various illustrative logical blocks, modules, circuits, algorithm, and/or steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the embodiments disclosed herein may be embodied directly in firmware, hardware, in a software module executed by a processor, or in a combination thereof. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

While the present disclosure has been described with reference to certain embodiments, it will be noted understood by, for example, those skilled in the art that various changes and modification could be made and equivalents may be substituted without departing from the scope of the present disclosure as defined, for example, in the appended claims. In addition, many modifications may be made to adapt a particular situation or material to the teachings of the present disclosure without departing from its scope. The functions, steps and/or actions of the method claims in accordance with the embodiments of the present disclosure described herein need not be performed in any particular order. Furthermore, although elements of the present disclosure may be described or claimed in the singular, the plural is contemplated unless limitation to the singular is explicitly stated. Therefore, it is intended that the present disclosure not be limited to the particular embodiment disclosed, but that the present disclosure will include all embodiments falling within the scope of the appended claims.

What is claimed is:

1. A system, comprising:
 a first plurality of circuits in a client device for presentation of at least one non-programming media asset with programming media content at the client device, the first plurality of circuits are configured to:
  transmit a request to a media presentation and distribution system, wherein the request comprises at least one user preference for the programming media content,
  wherein the media presentation and distribution system comprises a second plurality of circuits, wherein the second plurality of circuits are configured to:
   transmit, based on the at least one user preference in the request, a first media stream to the client device in response to the request received from the client device,
   wherein the first media stream comprises the programming media content and at least one tag associated with the programming media content;
   receive, from the client device, at least one occurrence of at least one event opportunity point within the programming media content that is identified by the client device;
   insert the at least one tag at the at least one event opportunity point within the programming media content to enable a media analysis service within the media presentation and distribution system,
wherein the at least one tag is inserted based on a sequence of one or more programs in the request received from the client device, and
wherein the at least one occurrence of at least one event opportunity point within the programming media content is received based on the at least one tag associated with the programming media content; and
select the at least one occurrence of the at least one event opportunity point based on a selection criteria for the at least one event opportunity point,
wherein the at least one event opportunity point corresponds to a specified event in the programming media content transmitted through the first media stream;
wherein the first plurality of circuits at the client device are further configured to:
modify a display view at the client device to partition the display view into a first partition and a second partition for a defined duration based on a combination of the at least one selected event opportunity point within the programming media content and the at least one tag associated with the programming media content; and
present the at least one non-programming media asset from a second media stream for the defined duration and a different version of the programming media content in the first partition, concurrently with a downscaled version of the programming media content from the first media stream over the second partition of the modified display view of the client device,
wherein the presentation of the at least one non-programming media asset in the first partition is based on the at least one user preference for a specific item in the programming media content and a user selection of the at least one non-programming media asset displayed in the past,
wherein the concurrent presentation of the at least one non-programming media asset with the programming media content is based on a targeted selection of the at least one event opportunity point to improve an attention span of a user with the programming media content at the client device.

2. The system according to claim 1, wherein the specified event within the programming media content corresponds to at least one of start credits, end credits, lull points, time-based marked regions, location-based marked regions, context-based marked regions, start of explicit scene and end of the explicit scene, or product placement opportunities, within the programming media content.

3. The system according to claim 1, wherein the at least one tag corresponds to a client manifest,
wherein the second plurality of circuits are further configured to create and transmit the client manifest to the client device,
wherein the client manifest is interpreted by the first plurality of circuits at the client device,
wherein the at least one tag is represented by at least one of a signal, a beacon, a marker, textual information, binary information, visual information, and aural information in the first media stream,
wherein the modification of the display view at the client device is based on the at least one tag,
wherein the transmission of the first media stream to the client device is via an HTTP Live Streaming (HLS) technique or a Dynamic Adaptive Streaming over HTTP (DASH) technique, and a digital streaming protocol, and
wherein the request received from the client device comprises the at least one user preference for a personalized playlist of the media programming content.

4. The system according to claim 1,
wherein the modification of the display view at the client device comprises at least one of a squeeze-back of the programming media content to a defined region within the display view, an overlay over the defined region within the display view, or split views of the display view, and
wherein the modification in the display view of the client device is personalized based on at least one of a retrieved set of user-preferences and a response received from the media presentation and distribution system.

5. The system according to claim 1, wherein the selection criteria for the selection of the at least one event opportunity point is based on at least one of a retrieved set of user-preferences, defined goals, a measured attention of the user associated with the client device, time constraints, inventory constraints, or user-defined constraints.

6. The system according to claim 1, wherein the first media stream and the second media stream are received at the client device as concurrent media streams.

7. A system, comprising:
at least one circuit in a media presentation and distribution system for presentation of at least one non-programming media asset with programming media content at a client device, wherein the at least one circuit is configured to:
transmit a first media stream to the client device based on a request received from the client device, wherein the first media stream comprises programming media content and at least one tag associated with the programming media content,
wherein the request comprises at least one user preference, and
wherein the transmission of the first media stream is based on the at least one user preference;
receive, from the client device, at least one occurrence of at least one event opportunity point within the programming media content that is identified by the client device;
insert at least one tag at the at least one event opportunity point within the programming media content to enable a media analysis service within the media presentation and distribution system,
wherein the at least one tag is inserted based on a sequence of one or more programs in the request received from the client device, and
wherein the at least one occurrence of at least one event opportunity point within the programming media content is received based on at least one tag associated with the programming media content;
respond to the at least one occurrence of the at least one event opportunity point received from the client device based on a selection criteria for the at least one event opportunity point, wherein the at least one event opportunity point corresponds to a specified event within the programming media content;
control at least one modification in a display view at the client device to partition the display view into a first partition and a second partition for a defined duration based on a combination of the at least one event opportunity point within the programming media content of the first media stream and the at least one tag associated with the programming media content; and instruct presentation of the at least one non-programming media asset from a second media stream for the defined duration and a different version of the programming media content in the first partition, concurrently with a downscaled version of the programming media content from the first media stream over the second partition of the at least one modified display view of the client device, wherein the presentation of the at least one non-programming media asset in the first partition is based on the at least one user preference for a specific item in the programming media content and a user selection of the at least one non-programming media asset displayed in the past, wherein the concurrent presentation of the first media stream and the at least one non-programming media asset is based on the response to the at least one event opportunity point to improve an attention span of a user with the programming media content at the client device.

8. The system according to claim 7, wherein the at least one circuit is further configured to:
determine a context of the programming media content in the first media stream and a corresponding context of the at least one non-programming media asset in the second media stream to be selected for the concurrent presentation with the programming media content; and
select the at least one non-programming media asset in the second media stream for the concurrent presentation with the programming media content based on the determined context of the programming media content and the corresponding context of the at least one non-programming media asset.

9. The system according to claim 7, wherein the at least one circuit is further configured to:
retrieve a set of user-preferences for the user associated with the client device; and
select the at least one non-programming media asset for the concurrent presentation with the programming media content in the first media stream based on the retrieved set of user-preferences.

10. The system according to claim 7, wherein at least one circuit is further configured to:
determine the at least one event opportunity point within the programming media content.

11. The system according to claim 10, wherein the determination of the at least one event opportunity point is based on content recognition of the programming media content within the first media stream.

12. The system according to claim 10, wherein the determination of the at least one event opportunity point is based on one of semantic mining or context mining of a context of the programming media content in the first media stream.

13. The system according to claim 7, wherein the at least one circuit is further configured to:
generate at least one notification based on a defined set of rules for the at least one event opportunity point within the programming media content; and
transmit at least one notification to one of the client device or at least one delivery platform associated with the client device.

14. The system according to claim 13, wherein the at least one circuit is further configured to:
receive a request based on a user response from the client device for the at least one transmitted notification at the client device or the at least one delivery platform; and
instruct presentation of the at least one non-programming media asset for the request from the client device.

15. The system according to claim 13, wherein the at least one notification is generated based on the presentation of the at least one non-programming media asset at the at least one event opportunity point within the programming media content in the first media stream.

16. The system according to claim 13, wherein the defined set of rules for generation of the at least one notification comprises at least one of user-defined constraints, client-device constraints, defined goal of impressions, reach or views, a defined time of generation of the at least one notification, or a specified type of the at least one notification.

17. The system according to claim 7, wherein the at least one circuit is further configured to verify an enablement of the at least one modification in the display view of the client device and the presentation of the at least one non-programming media asset within the client device.

18. A method, comprising:
in a client device for presentation of at least one non-programming media asset with programming media content at the client device:
transmitting, by a first plurality of circuits in the client device, a request to a media presentation and distribution system, wherein the request comprises at least one user preference for programming media content,
wherein the media presentation and distribution system comprises a second plurality of circuits for:
transmitting, by the second plurality of circuits, based on the at least one user preference in the request, a first media stream to the client device in response to the request received from the client device, wherein the first media stream comprises the programming media content and at least one tag associated with the programming media content,
receiving, by the second plurality of circuits, from the client device, at least one occurrence of at least one event opportunity point within the programming media content that is identified by the client device;
inserting the at least one tag at the at least one event opportunity point within the programming media content to enable a media analysis service within the media presentation and distribution system,
wherein the at least one tag is inserted based on a sequence of one or more programs in the request received from the client device, and
wherein the at least one occurrence of at least one event opportunity point within the programming media content is received based on the at least one tag associated with the programming media content, and
responding to, by the second plurality of circuits, the at least one occurrence of the at least one event opportunity point based on a selection criteria for the at least one event opportunity point, wherein the at least one event opportunity point corresponds to a specified event within the programming media content, modifying, by the first plurality of circuits at the client device, a display view to partition the display view into a first partition and a second partition for a defined duration based on a combination of the at least one event opportunity point within the programming media content of the first media stream and the at least one tag associated with the programming media content; and presenting, by the first plurality of circuits, the at least one non-programming media asset from a second media stream for the defined duration and a different version of the programming media content in the first partition, concurrently with a downscaled version of the programming media content from the first media stream over the second partition of the modified display view of the client device, wherein the presentation of the at least one non-programming media asset in the first partition is based on the at least one user preference for a specific item in the programming media content and a user selection of the at least one non-programming media asset displayed in the past, wherein the concurrent presentation of the at least one non-programming media asset with the programming media content is based on a targeted selection of the at least one event opportunity point to improve an attention span of a user with the programming media content at the client device.

19. The method according to claim 18, wherein the specified event within the programming media content corresponds to start credits, end credits, contextual lull points, time-based marked regions, location-based marked regions, and context-based marked regions within the programming media content.

20. A method, comprising:

in a media presentation and distribution system for presentation of at least one non-programming media asset with programming media content at a client device:

transmitting, by at least one circuit, a first media stream to the client device based on a request received from the client device, wherein the first media stream comprises programming media content and at least one tag associated with the programming media content, wherein the request comprises at least one user preference, and wherein the transmission of the first media stream is based on the at least one user preference;

receiving, by the at least one circuit, from the client device, at least one occurrence of at least one event opportunity point within the programming media content that is identified by the client device;

inserting the at least one tag at the at least one event opportunity point within the programming media content to enable a media analysis service within the media presentation and distribution system, wherein the at least one tag is inserted based on a sequence of one or more programs in the request received from the client device, and wherein the at least one occurrence of at least one event opportunity point within the programming media content is received based on the at least one tag associated with the programming media content;

responding to, by the at least one circuit, the at least one occurrence of the at least one event opportunity point received from the client device based on a selection criteria for the at least one event opportunity point, wherein the at least one event opportunity point corresponds to a specified event within the programming media content;

controlling, by at least one circuit, at least one modification in a display view at the client device to partition the display view into a first partition and a second partition for a defined duration based on a combination of the at least one event opportunity point within the programming media content of the first media stream and the at least one tag associated with the programming media content; and instructing, by at least one circuit, presentation of the at least one non-programming media asset from a second media stream for the defined duration and a different version of the programming media content in the first partition, concurrently with a downscaled version of the programming media content from the first media stream over the second partition of the at least one modified display view of the client device, wherein the presentation of the at least one non-programming media asset in the first partition is based on the at least one user preference for a specific item in the programming media content and a user selection of the at least one non-programming media asset displayed in the past, wherein the concurrent presentation of the at least one non-programming media asset with the programming media content is based on a targeted selection of the at least one event opportunity point to improve an attention span of a user with the programming media content at the client device.

21. The method according to claim 20, wherein the at least one tag corresponds to a client manifest, wherein the at least one circuit are further configured to create and transmit the client manifest to the client device, wherein the client manifest is interpreted by at least one second circuit at the client device, wherein the at least one tag is represented by at least one of a signal, a beacon, a marker, textual information, binary information, visual information, and aural information in the first media stream, wherein the at least one modification of the display view at the client device is based on the at least one tag, wherein the transmission of the first media stream to the client device is via a HTTP Live Streaming (HLS) technique or a Dynamic Adaptive Streaming over HTTP (DASH) technique, and a digital streaming protocol, and wherein the request received from the client device comprises the at least one user preference for a personalized playlist of the at least one media programming content.

22. The method according to claim 20, further comprising verifying, by the at least one circuit, an enablement of at least one modification in the display view of the client device and the presentation of the at least one non-programming media asset within the at least one of modified display view at the client device.

23. A non-transitory computer-readable medium having stored thereon, computer implemented instructions that when executed by a processor, causes the processor to execute operations, the operations comprising:

in a client device for presentation of at least one non-programming media asset with programming media content at the client device:
transmitting a request to a media presentation and distribution system, wherein the request comprises at least one preference for programming media content provided by a user,
wherein the media presentation and distribution system is coupled with the client device for:
  transmitting, based on the at least one preference for programming media content in the request, a first media stream to the client device in response to the request received from the client device, wherein the first media stream comprises the programming media content and at least one tag associated with the programming media content,
  receiving, from the client device, at least one occurrence of at least one event opportunity point within the programming media content that is identified by the client device;
  inserting at least one tag at the at least one event opportunity point within the programming media content to enable a media analysis service within the media presentation and distribution system,
  wherein the at least one tag is inserted based on a sequence of one or more programs in the request received from the client device, and
  wherein the at least one occurrence of at least one event opportunity point within the programming media content is received based on the at least one tag associated with the programming media content, and
  responding to the at least one occurrence of the at least one event opportunity point received from the client device based on a selection criteria for the at least one event opportunity point, wherein the at least one event opportunity point corresponds to a specified event within the programming media content;
  modifying a display view to partition the display view into a first partition and a second partition for a defined duration based on a combination of the at least one event opportunity point within the programming media content of the first media stream and the at least one tag associated with the programming media content; and
  presenting the at least one non-programming media asset from a second media stream for the defined duration and a different version of the programming media content in the first partition, concurrently with a downscaled version of the programming media content from the first media stream over the second partition of the modified display view of the client device,
wherein the presentation of the at least one non-programming media asset in the first partition is based on the at least one user preference for a specific item in the programming media content and a user selection of the at least one non-programming media asset displayed in the past,
wherein the concurrent presentation of the first media stream and the at least one non-programming media asset is based on a targeted selection of the at least one event opportunity point to improve an attention span of the user with the programming media content at the client device.

* * * * *